( 12 ) United States Patent
Smith

(10) Patent No.: US 6,381,549 B1
(45) Date of Patent: Apr. 30, 2002

(54) SYSTEM AND METHOD USING DIGITAL FILTERS AND NEURAL NETWORKS TO DETERMINE FLUID FLOW

(75) Inventor: Milton O. Smith, Bothell, WA (US)

(73) Assignee: Dolphin Technology, Inc., Seattle, WA (US)

(*) Notice: Subject to any disclaimer, the term of this patent is extended or adjusted under 35 U.S.C. 154(b) by 0 days.

(21) Appl. No.: 09/239,174

(22) Filed: Jan. 28, 1999

(51) Int. Cl.[7] ................................................. G01F 1/66
(52) U.S. Cl. ...................................... 702/54; 73/861.28
(58) Field of Search ........................ 73/861.18, 861.27, 73/861.28, 861.29, 861.31, 622, 602, 597; 702/50, 51, 54, 85, 100, 103

(56) References Cited

U.S. PATENT DOCUMENTS

| | | | | |
|---|---|---|---|---|
| 3,780,577 A | * | 12/1973 | Brown | 73/861.28 |
| 3,869,915 A | * | 3/1975 | Baumoel | 73/861.28 |
| 3,882,722 A | | 5/1975 | McShane | 73/194 A |
| 3,894,431 A | | 7/1975 | Muston et al. | 73/194 |
| 3,935,735 A | | 2/1976 | Lee | 73/194 |
| RE28,929 E | | 8/1976 | Brown | 73/194 |
| 3,974,693 A | | 8/1976 | Hardies | 73/194 A |
| 4,308,754 A | | 1/1982 | Pedersen et al. | 73/861.28 |
| 4,527,433 A | | 7/1985 | Gutterman | 73/861.28 |
| 4,596,133 A | | 6/1986 | Smalling et al. | 73/24 |
| 4,633,719 A | * | 1/1987 | Vander Heyden | 73/861.28 |
| 4,752,917 A | | 6/1988 | Dechape | 367/125 |
| 5,371,686 A | | 12/1994 | Nabity et al. | 364/510 |
| 5,741,980 A | * | 4/1998 | Hill et al. | 73/861.04 |
| 5,777,238 A | | 7/1998 | Fletcher-Haynes | 73/861.31 |

OTHER PUBLICATIONS

Bevington, Philip R., *Data Reduction and Error Analysis for the Physical Sciences*, McGraw–Hill, Inc., New York, 1969, pp. 204–205.

* cited by examiner

Primary Examiner—Hal Wachsman
Assistant Examiner—Craig Steven Miller
(74) Attorney, Agent, or Firm—Seed IP Law Group PLLC

(57) ABSTRACT

An ultrasonic flowmeter using ultrasonic pulses transmitted within a pipe containing flowing fluid determines values, including flow rate or fluid velocity of the flowing fluid. The ultrasonic flowmeter transmits trains of ultrasonic pulses having velocity components either in the upstream or downstream direction. The ultrasonic flowmeter includes the transducer placed downstream external to the pipe and a transducer placed upstream external to the pipe. Time measurements are made to determine a time, $T_U$, required for a pulse train to travel from the downstream transducer to the upstream transducer and the time, $T_D$, required for a pulse train to travel from the upstream transducer to the downstream transducer. The ultrasonic flowmeter is configured to have consistent triggering of the pulses of the pulse train to reduce error. Also, the electronics are simplified to allow for lower timing resolution requirements. Once $T_U$ and $T_D$ are determined, a series of validation filters, parameter filters, coarse flow rate filters, and refined flow rate filters are used to determine flow measurement. Alternatively, fluid velocity filters are used. Also, diameter filters are used to determine the current interior diameter of the pipe. All measurements are made noninvasively. The system and method includes determining coefficients for the various filters to account for variability in dimensions, parameters and conditions involved.

25 Claims, 18 Drawing Sheets

SYSTEM AND METHOD USING DIGITAL FILTERS AND NEURAL NETWORKS TO DETERMINE FLUID FLOW

TECHNICAL FIELD

The present invention relates generally to flowmeters, and more particularly, to ultrasonic flowmeters.

BACKGROUND OF THE INVENTION

Water meters to measure flow rate or velocity of a fluid inside a pipe are abundant and diverse and are available from many manufacturers. The most popular and least expensive are the turbine meters. These meters can cover two orders of magnitude in flow, e.g., 0.2 gal/min to 20 gal/min. One drawback of many meters including the turbine meters is that installation of the meters requires that the pipe carrying the fluid to be measured must be cut to place the measuring device inside the pipe. This installation oftentimes has associated labor costs that are greater than the cost of the meter itself. Other problems with such in-flow meters include the tendency for the meters to become clogged and their calibration to deteriorate over time.

Non-invasive water meters have addressed the installation problems caused by others meters. The most common type of non-invasive water meter uses ultrasonic pulses. The ultrasonic pulses are sent both downstream and upstream relative to the flow of the fluid within the pipe. The difference in time required to travel upstream versus downstream is then used to determine the velocity of the fluid flowing within the pipe. These ultrasonic meters, however, are very expensive. Typically, a single meter costs between $5,000 and $10,000. This high expense limits the scope of application for these non-invasive meters. A main factor in this large expense is that considerable resources are devoted to ensuring accuracy of the flow rate and fluid velocity measurement.

Unfortunately, prior art flowmeters have limited success in producing accurate measurements. There are many factors influencing flow rate and fluid velocity measurement. However, prior art meters can only inherently account for variation in a small number of the factors. The factors influencing flow rate and fluid velocity measurement include changes in acoustic velocity of the measured fluid due to causes such as temperature changes, turbulence, mixing with gases or particulate, or changes in fluid type. Acoustic velocity of the ultrasonic pulse traveling through the material of the pipe and transducers involved can also vary as the materials used vary in different applications. Other factors influencing flow rate and fluid velocity measurement relate to the distances traveled by the ultrasonic pulses. Variation in these distances depend on factors such as changes in inside pipe diameter due to pipe construction, sludge built-up inside the pipe, pipe wall thickness, or placement of the transducers. Additional factors are associated with the electronics used such as timer accuracies and electronic delays.

The prior art approaches may address variability resulting from a few of the factors. However, fundamentally, the prior art approaches are not constructed to deal with variability in a wide range of factors involved in obtaining a measurement. Thus, the prior art approaches select a limited number, such as one or two, of the factors and arrange complicated and expensive schemes to compensate for variability in the selected factors. What is missing in the prior art systems and methods of measuring flow rate and fluid velocity are inexpensive, noninvasive meters that account for variability in a wide range of factors, including those mentioned, and that are adaptive for additional factors later added. Accounting for variability in all factors that influence measurement of flow rate and fluid velocity would produce more consistently accurate flow rate and fluid velocity measurements in a wide variety of environments. The present invention fulfills these needs and further provides other related advantages.

SUMMARY OF THE INVENTION

The present invention resides in an ultrasonic system for fluid contained within a pipe. The ultrasonic system includes upstream and downstream transducers mountable on the pipe. The transducers are configured to receive ultrasonic pulses.

The ultrasonic system further includes a processor having a timer and a counter. The processor is configured to use the timer and counter to determine a time period, $T_U$, associated with a first number of ultrasonic pulses received by the upstream transducer. The processor is further configured to use the timer and counter to determine a time period, $T_D$, associated with a second number of ultrasonic pulses received by the downstream transducer. The processor is configured to determine at least one characteristic of the fluid or the pipe based on $T_U$ and $T_D$ and based on a filter system. In one aspect of the invention the filter system comprises at least one linear filter wherein one of the at least one linear filter includes a coefficient, a1, for a term of $a1*T_U$, and a coefficient, a2, for a term of $a2*T_D$, the coefficients a1 and a2 not being equal to one another. In another aspect of the ultrasonic system, the filter system comprises at least one non-linear filter. In a further aspect of the ultrasonic system, the filter system comprises at least one neural network.

Further aspects of the ultrasonic system include filter systems having parameter filters and validation filters. The filter systems may also further include filter coefficients based on variability in at least one of piped diameter, acoustic fluid velocity, differential offset errors, and common offset errors.

DETAILED DESCRIPTION OF THE INVENTION

Figure 1:
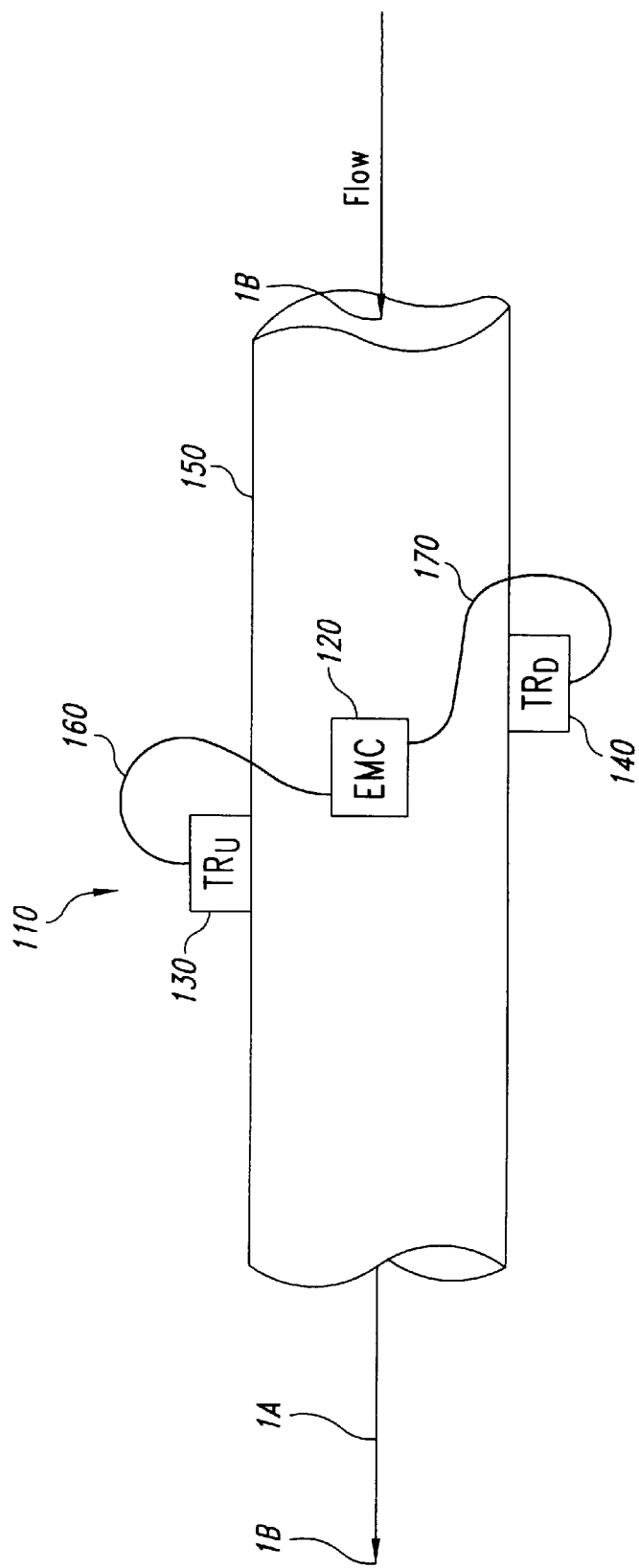
FIG. 1 is a perspective view showing an ultrasonic flowmeter in accordance with the present invention attached to an external surface of a pipe.

As shown in the drawings for purposes of illustration, the present invention is embodied in an ultrasonic flowmeter, indicated generally by reference 110. The ultrasonic flowmeter 110 of the depicted embodiment includes an electronic measurement and control (EMC) 120, and ultrasonic transducers 130 and 140 mounted externally to a pipe or conduit 150 as shown in FIG. 1. The ultrasonic transducers 130 and 140 are displaced from one another at least along the longitudinal axis 1A of the pipe 150 extending the length of the pipe segment illustrated. The ultrasonic transducers 130 and 140 are connected to the EMC 120 by signal lines 160 and 170, respectively. The signal lines carry either electrical, optical, wireless, or other type signals between the transducers 130 and 140 and the EMC 120. In another embodiment, the EMC 120, transducers 130 and 140, and signal lines 130a and 140a are all integrated into a structural housing which is then mounted externally to the pipe 150. Alternatively, in another embodiment, the EMC 120 need not be externally mounted to the pipe and is remotely located in relation to the transducers 130 and 140. In this alternative embodiment, the transducers 130 and 140 are externally mounted to the pipe 150, and send and receive signals to the EMC 120 through electromagnetic wireless signals.

Multi-family dwellings and apartments are a typical application for the depicted embodiment of the present invention since this environment generally lacks the capability to quantify the amount of water used by individual housing units. In such situations where individual meters are not used, the water bill is divided equally among the various users of the multi-family units regardless of the actual use of each user. It can be charged separately or just included within the rent charged. Sub-metering apartment units for water has typically not been performed due to the cost of installing, maintaining and reading water meters. Although metering water flows has large potential application for the present invention and some of the embodiments are described in terms of water flows in terms gallons per minute, the present invention can be used to measure flow characteristics of many fluids, including the flow rate and fluid velocity of liquids and gasses contained in pipes of various diameter. The present invention can be used to measure fluids, including liquids and gases, having flow rates either very small or large so that another unit of flow rate measure other than gallons per minute would be more suitable. It is to be understood that the term "pipe" used herein is not limited to those tubular structures commonly referred to as pipes, but is also directed to structures that are differently shaped or either smaller or larger than conventional pipes. For instance, the present invention is applicable to structures including conduits, tubes, and vessels regardless of cross-sectional shape or length.

The transducers 130 and 140 in the depicted flowmeter 110 are mounted on opposite sides of the pipe's diameter, however, other embodiments include variations to this placement which allow for internal reflections within the pipe as known in the art. The depicted flowmeter 110 shows transducer 130 displaced from transducer 140 along the longitudinal axis 1A of the pipe 150. This lengthwise displacement along the path of fluid flow in the pipe 150 is used to determine fluid velocity and fluid flow.

The ultrasonic flowmeter 110 of the depicted embodiment takes advantage of how flowing fluid influences ultrasonic pulses traveling through the fluid. If the travel of the fluid (the direction being indicated by the arrowhead 1B on the longitudinal axis 1A in FIG. 1) includes a directional component in the same direction as the flow of the fluid, the velocity of the ultrasonic pulse along the direction of fluid flow will increase by the amount of the velocity of the flowing fluid. If a directional component of the ultrasonic pulse is in a direction opposite of the fluid flow, then the velocity of the ultrasonic pulse is decreased by the amount of the velocity of the flowing fluid. Thus, the amount of time required for an ultrasonic pulse to travel a certain distance in a flowing fluid is influenced by the velocity of the flowing fluid and the direction of the ultrasonic pulse relative to the direction of the fluid flow. If a time of travel measurement is taken of one ultrasonic pulse having a velocity component in the downstream direction, and another time of travel measurement is taken of an ultrasonic pulse having a velocity component in the upstream direction, these time of travel measurements can be used to determine flow rate or fluid velocity as explained further below.

Issues arise when using ultrasonic pulses because they travel much faster than the flowing fluid. For instance, the speed of sound in water is about 1500 m/sec compared to typical fluid velocities of 0.025 m/s (1"/sec) for a leak having a flow rate of 0.2 gallons per minute (gal/min) in a 1-inch diameter pipe. This great disparity in velocities is a challenge to the measurement of flow rate and fluid velocity with enough accuracy to detect the leak. If only one ultrasonic pulse for each upstream and downstream direction is used to measure flow rate, requirements for timing resolution are extremely high. Prior art systems attempt a solution to this problem by determining the amount of time required for a series or train of ultrasonic pulses to travel in both upstream and downstream directions. However, these prior art attempts do not eliminate the high resolution timing requirements. The way prior art systems generate and control the trains of ultrasonic pulses limit the number of ultrasonic pulses per train and add additional measurement errors. Typically, a prior art system can resolve only one part in five due to its limited system and method. Thus, with a reasonably priced 1 MHz timer, the prior art system could only resolve on the order of 1 $\mu$sec out of every 5 $\mu$sec. Applied to a typical example, the prior art system would only resolve a flow rate of 5 gal/min if they were measuring 25 gal/min. For the prior art system to resolve down to a more reasonable 0.1 gal/min resolution would require a 50 MHz timer, adding significantly to the cost of the system. In contrast, for the depicted flowmeter 110 of the present invention, very long trains of ultrasonic pulses having on the order of $10^5$ pulses are used when needed. Thus, with a reasonably priced 1 MHz timer used, even leak detection involving fluid velocities of 0.001 meters/second and flow rates of 0.04 gal/min are accurately measured using the flowmeter 110.

The ultrasonic flowmeter 110 measures time periods that either include the time required for a train of upstream ultrasonic pulses to go from the transducer 140 (the downstream transducer) to the transducer 130 (the upstream transducer), or include the time required for a train of downstream ultrasonic pulses to go from the upstream transducer 130 to the downstream transducer 140. Also included in the time measurement is the time required for associated electrical pulse signals to be sent through the various electrical circuits of ultrasonic flowmeter 110. The term electrical pulse signals is used throughout the disclosure because in the depicted embodiment the typical electrical signal used is an electrical pulse signal. However, in alternative embodiments the electrical pulse signals referred herein throughout the disclosure are also other forms of electrical signals. Thus, reference to "electrical pulse signals" throughout the disclosure should also be construed to include other forms of electrical signals besides the described electrical pulse signals.

To generate a train of ultrasonic pulses, the EMC 120 transmits a train of electrical pulse signals to one of the transducers 130 or 140 selected to be the transmitting transducer. The other transducer 130 or 140 not selected to be the transmitting transducer is selected to be the receiving transducer. The train of electrical pulse signals is generated by the EMC 120 by first generating an initial electrical pulse signal. The initial electrical pulse signal causes the selected transducer 130 or 140 to transmit an initial ultrasonic pulse. This initial ultrasonic pulse is subsequently received by the transducer 130 or 140 selected to be the receiving transducer. Upon receipt of the initial ultrasonic pulse, the receiving transducer 130 or 140 transmits a resultant electrical pulse signal. The EMC 120 then transmits this resultant electrical signal to the transmitting transducer 130 or 140 to cause another ultrasonic pulse and subsequent resultant electrical pulse signal to be generated and transmitted. Thus, cycles are created involving an ultrasonic pulse causing a resultant electrical pulse signal to be generated and the resultant electrical pulse signal causing another ultrasonic pulse to be generated. These cycles of ultrasonic pulses and resultant electrical pulse signals continue until the EMC 120 determines that a sufficient number of ultrasonic pulses have been transmitted to complete a train of ultrasonic pulses. The EMC 120 also determines time periods involved for the train of ultrasonic pulses and associated train of electrical pulse signals to travel through their respective media of fluid and electronic circuits. The EMC 120 then uses these time periods to determine characteristics of the fluid flow and flow velocity described further below.

Figure 2:
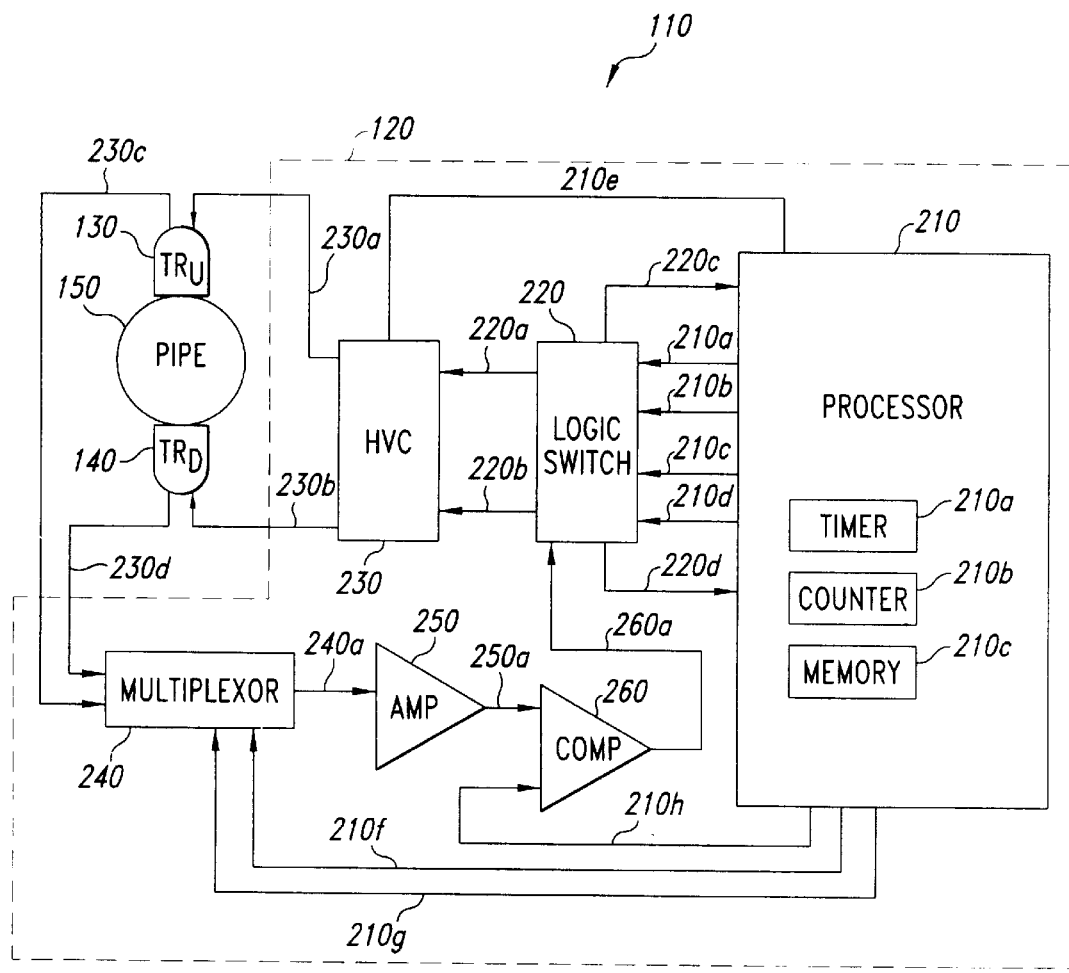
FIG. 2 is a schematic drawing illustrating the electronic components of the flowmeter of FIG. 1.

As shown in FIG. 2, the EMC 120 comprises a processor 210 electrically coupled to other components of the EMC that are associated with either transmitting or receiving the ultrasonic pulses. The processor 210 has among other things a timer 211a, a counter 211b, a memory 211c, and an output 211d. In addition to the processor 210, the other components involved with the transmission of ultrasonic pulses include a logic switch 220, a high voltage converter (HVC) 230, and the transducers 130 and 140. Components involved with the reception of ultrasonic pulses include the transducers 130 and 140, the processor 210, the logic switch 220, a multiplexor 240, an amplifier 250, and a comparator 260.

To initiate a train of ultrasonic pulses, the processor 210 transmits an initial electrical pulse signal to the logic switch 220 to initiate transmission of an initial ultrasonic pulse by a selected one of the transducers 130 or 140 designated by the logic switch control signals sent by the processor via control lines 210a, 210b, 210c, and 210d to the logic switch. Upon transmission of the initial electrical pulse signal, the processor 210 starts a timer 211a internal to the processor 210 to time the train of ultrasonic pulses and associated electrical pulse signals. The timer 211a of the processor 210 typically has a 1 MHz clock with a 1 μsec resolution. The logic switch 220 then transmits an electrical pulse signal to the HVC 230 via either signal line 220a under the command of the processor 210 via command lines 210a and 210b if the upstream transducer 130 is to transmit or via signal line 220b under command of the processor 210 via command lines 210c and 210d if the downstream transducer 140 is to transmit. In turn, once the HVC 230 receives an electrical pulse signal on either signal line 220a or 220b, the HVC then sends a high voltage electrical pulse either to the upstream transducer 130 via signal line 230a or to the downstream transducer 140 via signal line 230b. To help generate the high voltage electrical pulse, the processor 210 sends a pulse width modulation (PWM) digital signal to the HVC 230 via a signal line 210e which causes the voltage furnished by the HVC on the signal line 230a or 230b to increase to a level approximately an order of magnitude higher than that furnished by a power supply (not shown) used by the EMC 120. For the depicted embodiment, the HVC 230 generates a 100 V voltage level electrical pulse signal from a 6 V power supply and transmits to the selected transducer 130 or 140. When the high voltage pulse reaches the selected transducer (either the upstream transducer 130 or downstream 140 transducer), the transmitting transducer converts the high voltage electrical pulse into an ultrasonic pulse and transmits the ultrasonic pulse through the fluid contained in the pipe 150 in the direction of the other transducer.

The other transducer receives the ultrasonic pulse (either the downstream transducer 140 or the upstream transducer 130), and converts the received ultrasonic pulse into an electrical pulse signal and sends the electrical signal to the multiplexor 240 via either signal line 230c or 230d depending on whether the upstream transducer 130 or downstream transducer 140 respectively has received the ultrasonic pulse. The processor 210 uses control lines 210f and 210g to the multiplexor 240 to supply multiplexor control signals to designate which of the signal lines 230c or 230d, if any, is to be used by the multiplexor 240 to receive the electrical pulse signal from whichever of the transducers 130 or 140 was not designated to transmit. The multiplexor 240 in effect prevents any spurious electrical pulse signal from the transducer selected to transmit ultrasonic pulses from being passed on to the amplifier 250. Furthermore, the multiplexor allows the electrical pulse signal from the other transducer to be passed on to the amplifier 250. The multiplexor 240 then passes the received electrical pulse signal to the input of the amplifier 250 via a signal line 240a.

The amplifier 250 amplifies the signal level of the received electrical pulse signal by a gain of 40 dB and sends the electrical pulse signal to the comparator 260. The processor 210 designates via a control line 210h the minimum threshold voltage level required for any electrical pulse signal to pass through the comparator 260. Establishing a minimum threshold voltage level for any electrical pulse signal that can pass through the comparator 260 increases the reliability of time measurements by the processor 210 due to the added consistency for measuring any electrical pulse signal and triggering an electrical pulse signal in a subsequent cycle of an ultrasonic pulse and a resultant electrical pulse signal. The received electrical pulse signal having a voltage level higher than the minimum threshold is sent by the comparator 260 over signal line 260a to the logic switch 220.

The processor 210 controls the logic switch 220 to further eliminate any spurious electrical pulse signal caused by phenomenon such as ringing. The ringing phenomenon includes any ultrasonic pulse that is reflected inside the pipe 150 such that for each ultrasonic pulse transmitted by a transducer, the receiving transducer receives multiple reflected ultrasonic pulses during a small window of time after receiving the transducer transmitted ultrasonic pulse. Typically this small window of time is of a duration on the order of 10 $\mu$secs. To diminish the effects of the ringing phenomenon, first, the logic switch 220 receives the electrical pulse signal resulting from the transducer transmitted ultrasonic pulse. The processor 210 controls the logic switch 220 via control lines 210a–d to pass the electrical pulse signal to the HVC 230 via the same signal line of the signal lines 220a or 220b that was used to send the initial electrical pulse signal to initiate the ultrasonic pulse train. As described in more detail below, the processor 210 then prevents the logic switch 220 via control lines 210a–d from passing on any subsequent electrical pulse signal to the HVC 230 for a period of 10 $\mu$secs or any other appropriate time period associated with the ringing phenomenon. Preventing the logic switch 220 from passing on any electrical pulse signal on to the HVC 230 during this window of time after the electrical pulse signal associated with the originally transmitted ultrasonic pulse thus reduces any spurious electrical pulse signal due to the ringing phenomenon from cycling through the flowmeter 110.

The electrical pulse signal sent to the HVC 230 from the comparator 260 by the logic switch 220 is also sent to the processor 210 by the logic switch via signal line 220c or signal line 220d, depending upon if signal line 220a or 220b respectively was used to transmit the initial electrical pulse signal. Upon receipt of the electrical pulse signal over signal line 220c or 220d, the processor 210 increments the internal counter 211b to the first count. The internal counter 211b typically can count electrical pulse signals for 1 sec wherein the electrical pulse signals occur every 30 $\mu$secs. The processor 210 again increments the internal counter 211b of the processor 210 upon each receipt of an electrical pulse signal by the processor 210 via signal lines 220c or 220d. When the internal counter 211b of the processor 210 reaches a designated count stored in the memory 211c, the processor stops its internal timer 211a timing the pulse train and stores the time ($T_U$ for an upstream and $T_D$ for a downstream train of ultrasonic pulses) measured by the timer 211a into the memory 211c. As described below, the processor 210 uses this time measurement to determine characteristics of the flow and flow velocity. The processor 210 outputs these determination via the output 211d typically to display screens or via a data link to a receiving device such as a computer. Other data handling devices are also subject to receive the flow rate and fluid velocity determinations. The processor 210 controls the multiplexor 240 via control lines 210f and 210g to stop any other electrical pulse signals from passing to the amplifier 250 until the processor 210 generates another initial electrical pulse signal to start another train of ultrasonic pulses.

Since a train of ultrasonic pulses is produced by the cycling of ultrasonic pulses and resultant electrical pulse signals there are gaps of time between the ultrasonic pulses of any given train of ultrasonic pulses. The duration of these gaps of time between ultrasonic pulses results from the amount of time between when the logic switch 220 transmits an electrical pulse signal over one of either signal lines 220a or 220b to the HVC 230, and when the logic switch receives from the comparator 260 the resulting electrical pulse signal associated with that transmitted electrical pulse signal. The duration of these gaps of time between ultrasonic pulses also includes any electronic delay associated with the logic switch 220. This includes an amount of time between when the logic switch 220 receives the electrical pulse signal from the comparator 260 and when the logic switch transmits the next electrical pulse signal to the HVC 230. For a 1" fluid filled pipe 150 a typical time period between pulses is on the order of 30 $\mu$sec for the depicted flowmeter 110.

Figure 3A:
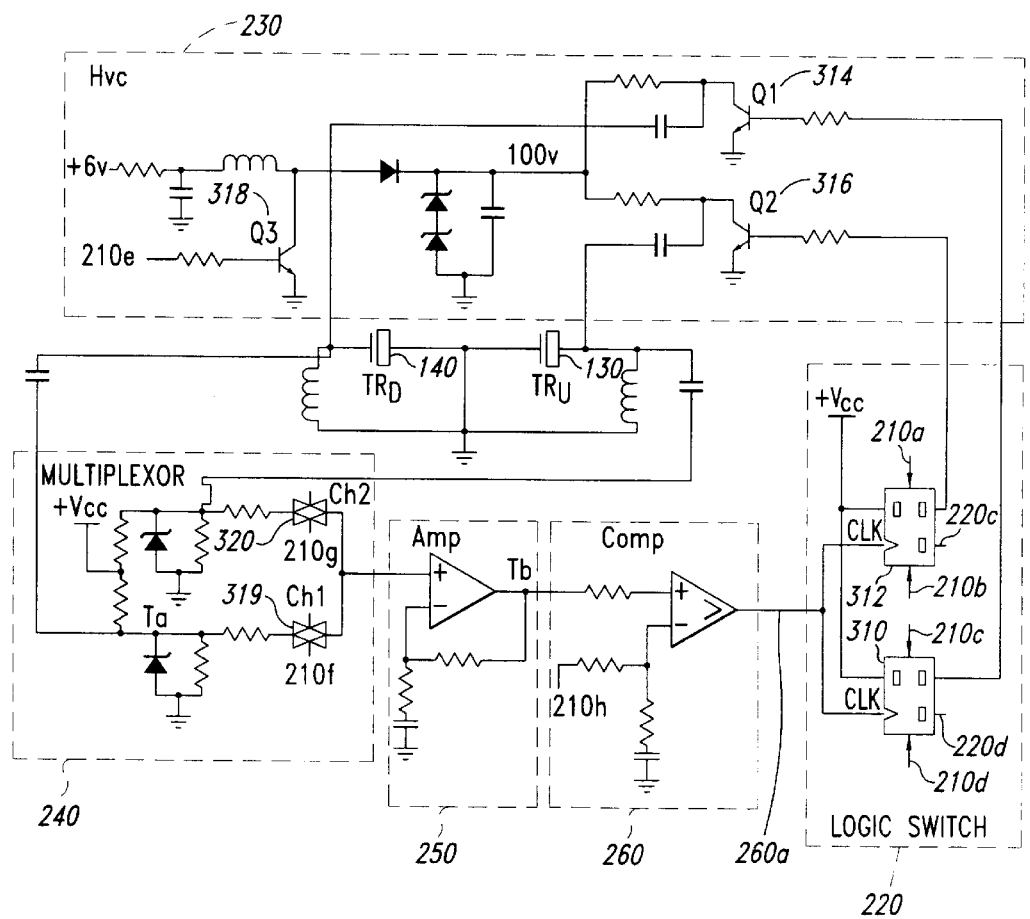
FIG. 3a is a more detailed schematic of the electronic components of the flowmeter of FIG. 1.

A more detailed schematic of some of the components of the flowmeter 110 is illustrated in FIG. 3a. The logic switch 220 is implemented in the depicted embodiment of the present invention using a dual D flip-flop (7474) having two D flip-flops 310 and 312 with independent control of the set and reset of both flip-flops by the processor 210 via control lines 210d and 210b, respectively, as shown in FIG. 3a. In the depicted embodiment the transducers 130 and 140 are a type of lead niobite with a resonant frequency of 1 MHz.

The HVC 230 utilizes two high voltage/high speed NPN transistors 314 and 316 to provide 5 ns 100 V negative pulses with a 1 MHz transducer resonant frequency to the transducers 130 and 140. A third NPN transistor 318 is controlled by a pulse wave modulated (PWM) digital output from the processor 210 via the signal line 210e to step up a six volt power supply voltage to 100 volts. The external power supply (not shown) typically is a lithium type nine volt battery with a 1.2 amp hour rating. Alternative embodiments of the invention utilize various other power sources well known in the art. The NPN transistors 314 and 316 are turned on by electrical signals sent by the D flip-flops 310 and 312, respectively. The processor 210 uses the resets 210d and 210b to the D flip-flops 310 and 312, respectively, to control the 10 $\mu$sec window of time. While the depicted embodiment uses a 10 $\mu$sec window of time, this window of time is adjustable by the processor 210 if other windows of time are more suitable to prevent false measurements.

The multiplexor 240 has two analog switches 318 and 320 used by the processor 210 via the control lines 210f and 210g, respectively, to select which of the transducers 130 and 140 receives the ultrasonic pulses transmitted by the other transducer. The processor 210 can also use the two analog switches 319 and 320 to block any electrical pulse signal from passing through the multiplexor 240 to the amplifier 250. This effectively stops a running cycle of ultrasonic pulses and resultant electrical pulse signals.

Figure 3C:
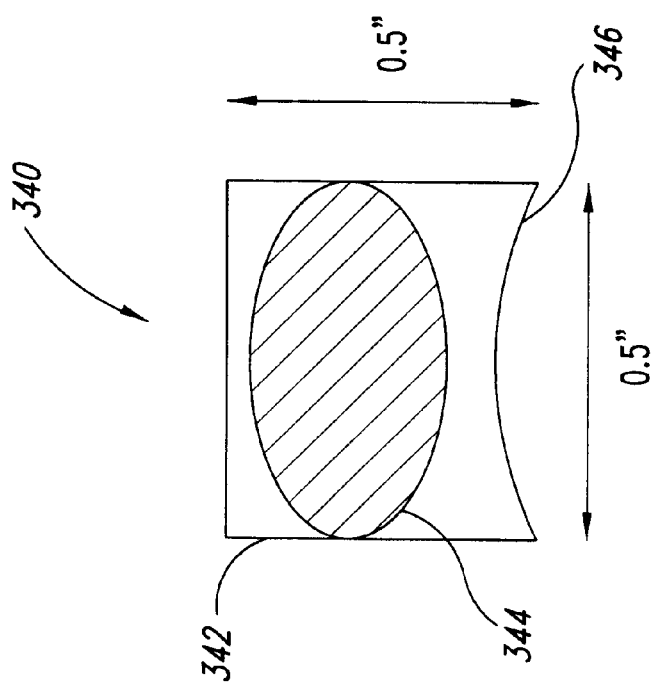
FIGS. 3b and 3c are detailed schematics of a transducer of an alternative embodiment of the flowmeter of FIG. 1.
Figure 3B:
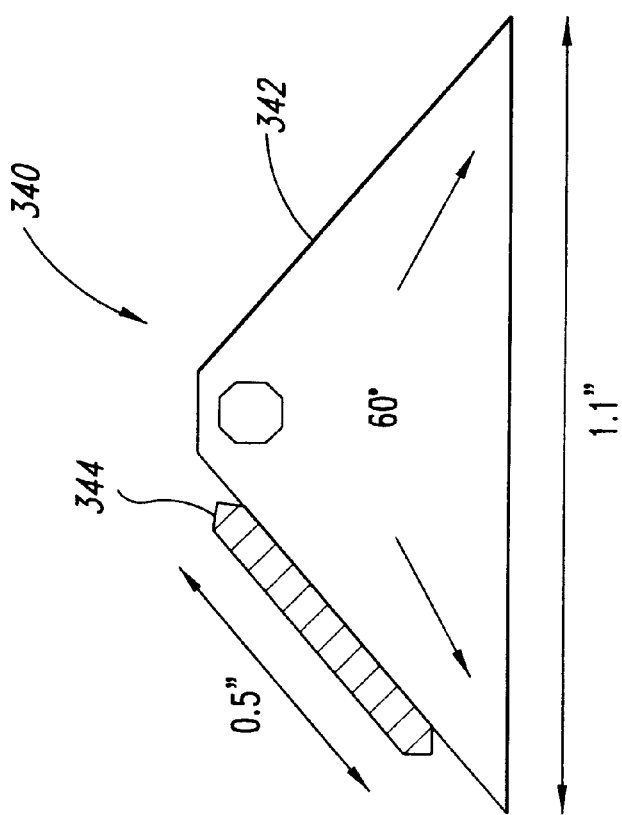

An alternative embodiment uses a unique piezo transducer 340 shown in FIGS. 3b and 3c that does not require the high voltage output of the HVC 230 of FIG. 2. Many of the components of the HVC 230 are eliminated or modified. The third NPN transistor 318 is no longer needed since 9 volts or less are required on the line of FIG. 2 marked "100v." Also, low voltage transistors replace the high voltage NPN transistors 314 and 316. Typically there are power savings on the order of a factor of 6 during measurement periods with this alternative embodiment that will extend the life of an external battery power source.

As shown in FIGS. 3b and 3c, the piezo transducer 340 comprises a wedge 342 made from a material such as polyvinyl chloride (PVC) Type II and a piezo element 344. An exemplary piezo element 344 could be obtained from American Piezo Ceramic, Inc., part no. D-0.500-1 Mhz-850. The exemplary piezo element 344 is approximately 0.05 inches thick and 0.5 inches in diameter. The piezo element 344 is attached to the PVC wedge 342 as shown in FIGS. 3a and 3b using a type of glue commonly referred to as superglue. The method of attachment helps to optimize acoustic transmission. The bottom of the PVC wedge 342 has a curved surface 346 as illustrated in FIG. 3c. This curved surface 346 is shaped to match the outer diameter of the pipe 150. For example, if the pipe 150 is ¾ inch schedule 40 PVC pipe, the outer diameter of the pipe would be approximately 1.25 inches.

The piezo element 344 is glued to the PVC wedge 342 with the positive side of the piezo element facing away from the PVC wedge. Two wires are soldered to each side of the piezo element 344 to be connected appropriately to the electronics of the ultrasonic flowmeter 110. To assist in routing the wires from the piezo element 344, a small groove (not shown) is milled in the PVC wedge 342. Typically the groove is 0.02 inches wide and 0.02 inches deep. This alternative embodiment results in more direct contact of the piezo element 344 with the PVC material than is found in typical transducers. This direct contact of the piezo element 344 with PVC material is beneficial especially for use with PVC pipes.

Figure 4:
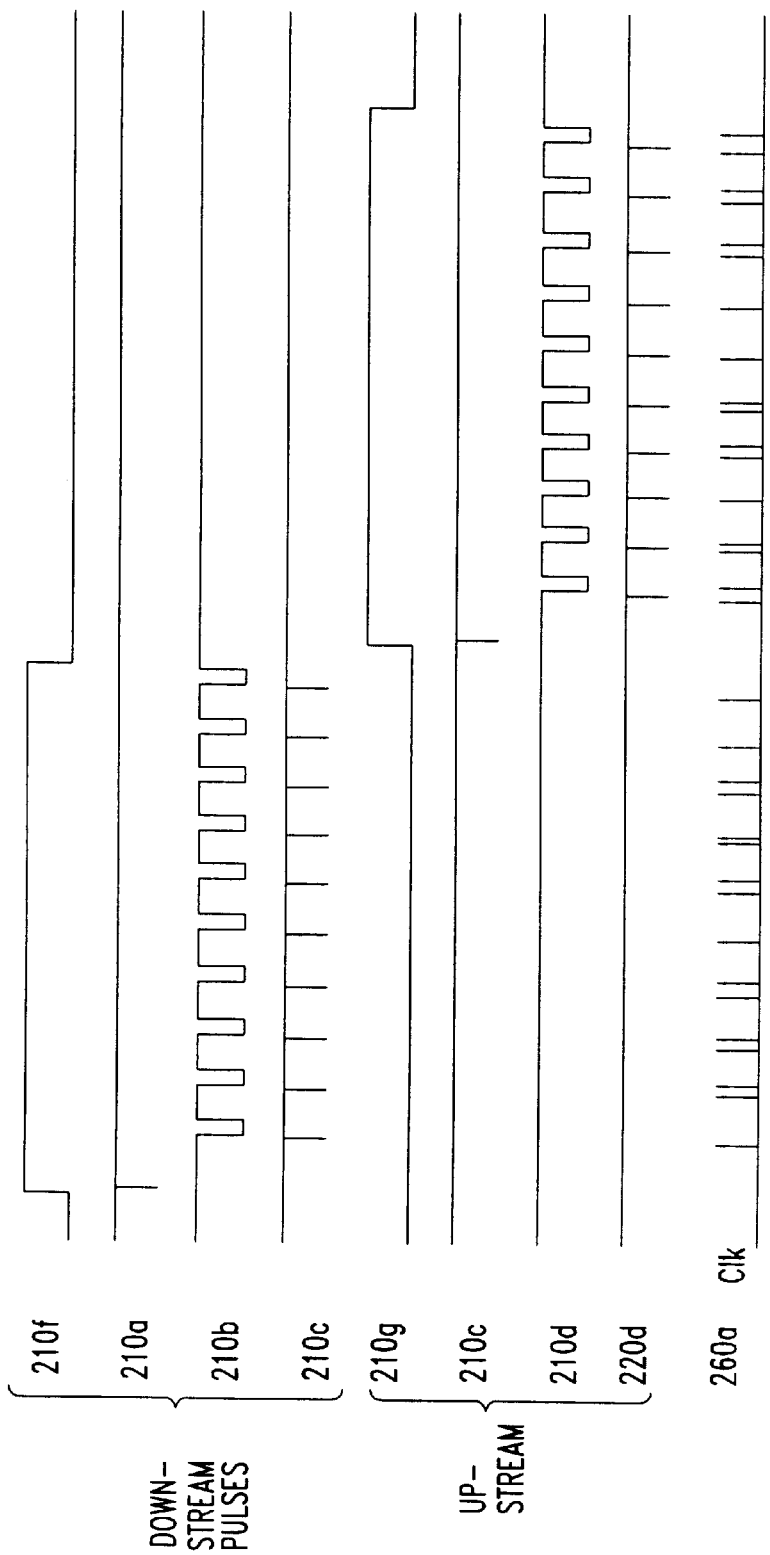
FIG. 4 is a timing diagram associated with the flowmeter of FIG. 1.

Exemplary timing diagrams having ten pulses for downstream and upstream trains of ultrasonic pulses are shown in FIG. 4 and described with reference also to each of the circuitry of FIG. 3a. Ten pulses is a far smaller number than what is typically used in a train of ultrasonic pulses and is merely used for illustration. Before transmitting an initial electrical pulse signal, the processor 210 selects which of the transducers 130 and 140 to transmit and which to receive the train of ultrasonic pulses. In the case of a downstream train of ultrasonic pulses being transmitted from the upstream transceiver 130 and being received by the downstream transceiver 140, the processor 210 sets control line 210f to a high voltage, as indicated on FIG. 4, causing the analog switch 319 of the multiplexor 240 (see FIG. 3a) to complete an electrical path from the downstream transducer 140 to the amplifier 250. After setting control line 210f high, the processor 210 initiates the downstream pulse train by momentarily pulsing the control line 210a, which is connected to the "set" input of the D flip-flop 312 low for approximately 1 μsec. This sends a first electrical pulse signal to the transistor 316 of the HVC 230 associated with the upstream transducer 130 and results in an ultrasonic pulse being sent by the upstream transducer. As discussed, the comparator 260 ultimately receives the associated received electrical pulse.

Upon the received electrical pulse exceeding a minimum voltage threshold, the comparator 260 passes the electrical pulse on to the D flip-flop 312. With both "set" 210a control line and "reset" 210b control line high, the D flip-flop 312 passes the pulse to the processor 210 via signal line 220c. Upon receipt of the pulse, the processor sets the "reset" control line 210b to a low voltage for nominally 10 μsec to prevent any false signals due to the ringing phenomenon from passing through the D flip-flop 312. The timing line of FIG. 4 for the control line 260a which is fed into the "CLK" input of the D flip-flop 312 shows that some pulses of the pulse train have several pulses grouped together in a cluster. By setting the reset control line 210b to a low voltage for the 10 μsec window, the processor 210 insures that only the first electrical pulse for each cluster of pulses passes through the D flip-flop 312. The first pulse of the cluster of pulses also is sent through the D flip-flop 312 back to the transistor 316 of the HVC 230 to repeat another pulse cycle for the pulse train being generated. When the counter 211b of the processor 210 increments to a designated count stored in the memory 211c, the processor sets the control line 210f to the analog switch 318 of the multiplexor 240 to low, thereby breaking the electrical connection between the downstream transducer 140 and the amplifier 250. This results in terminating any subsequent pulses from being received by the D flip-flop 312 which effectively ends the downstream pulse train being generated. An equivalent situation occurs for an upstream pulse train being sent from the downstream transducer 140 to the upstream transducer 130 and is illustrated in FIG. 4, except that the control lines 210c, d, and g, the signal line 220d and associated components are used instead.

Figure 5:
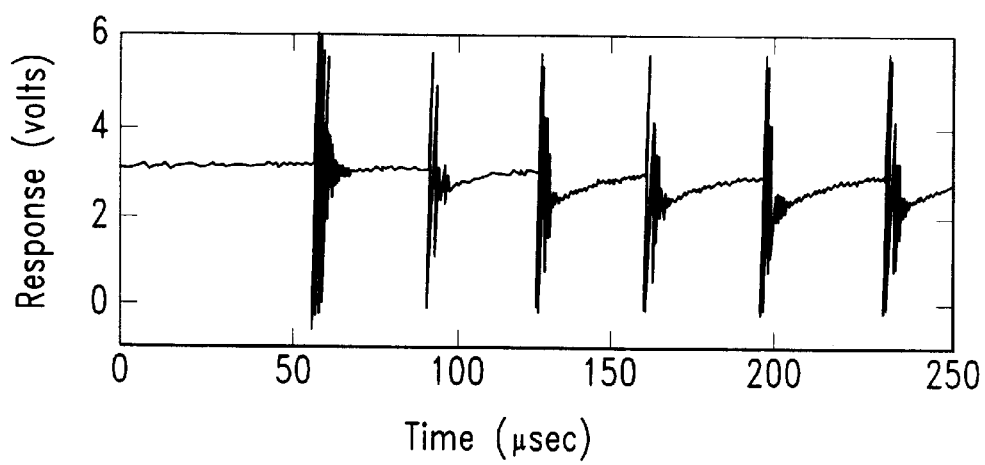
FIGS. 5 and 6 are voltage v. time plots of pulses associated with the flowmeter of FIG. 1.
Figure 6:
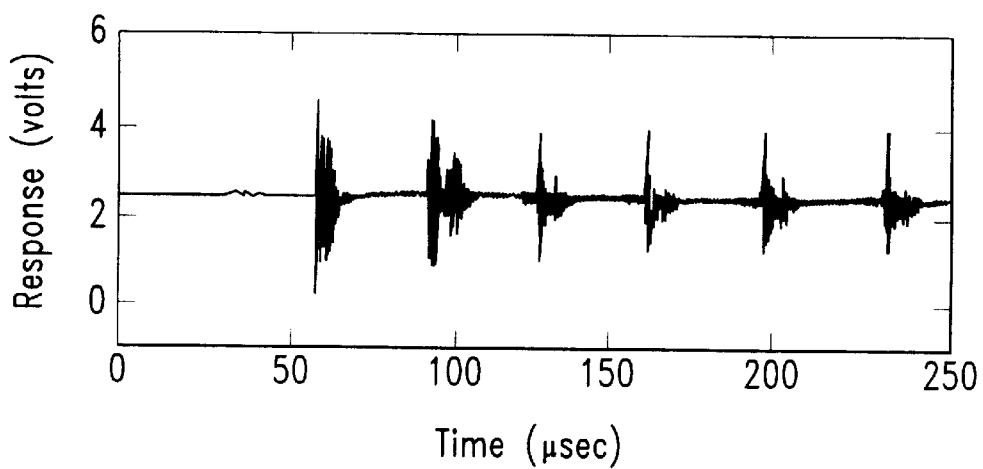

To better illustrate the concept of each pulse reaching the comparator 260 actually comprising a cluster of pulses, FIG. 5 shows electrical pulses of a pulse train first as they arrive at the transmitting transducer and FIG. 6 shows the electrical pulses as they arrive at the comparator 260. The comparator 260 with its minimum voltage threshold and the logic switch 220 with its 10 μsec time window combined effectively filter out noise associated with the cluster of pulses so that only one pulse reaches the processor 210 and HVC 230 for each cluster of pulses received at the comparator 260. Using a 10 μsec time window also prevents the processor 210 from receiving another type of false signal. Almost immediately after the HVC 230 sends a 100 V pulse to one of the transducers 130 or 140, the amplifier 250 sends out a false signal. This is because the HVC 230 and the amplifier 250 are physically close to one another on the circuit board holding them. The amplifier 250 is sensitive to 1 mV variations so amplifies spurious small group loop voltages caused by the HVC 230 initiating a 100 V pulse. These false signals caused by the proximity of the HVC 230 to the amplifier 250 occur well within the 10 μsec time window so these false signals do not pass through the D flip-flops 310 and 312.

Figure 7:
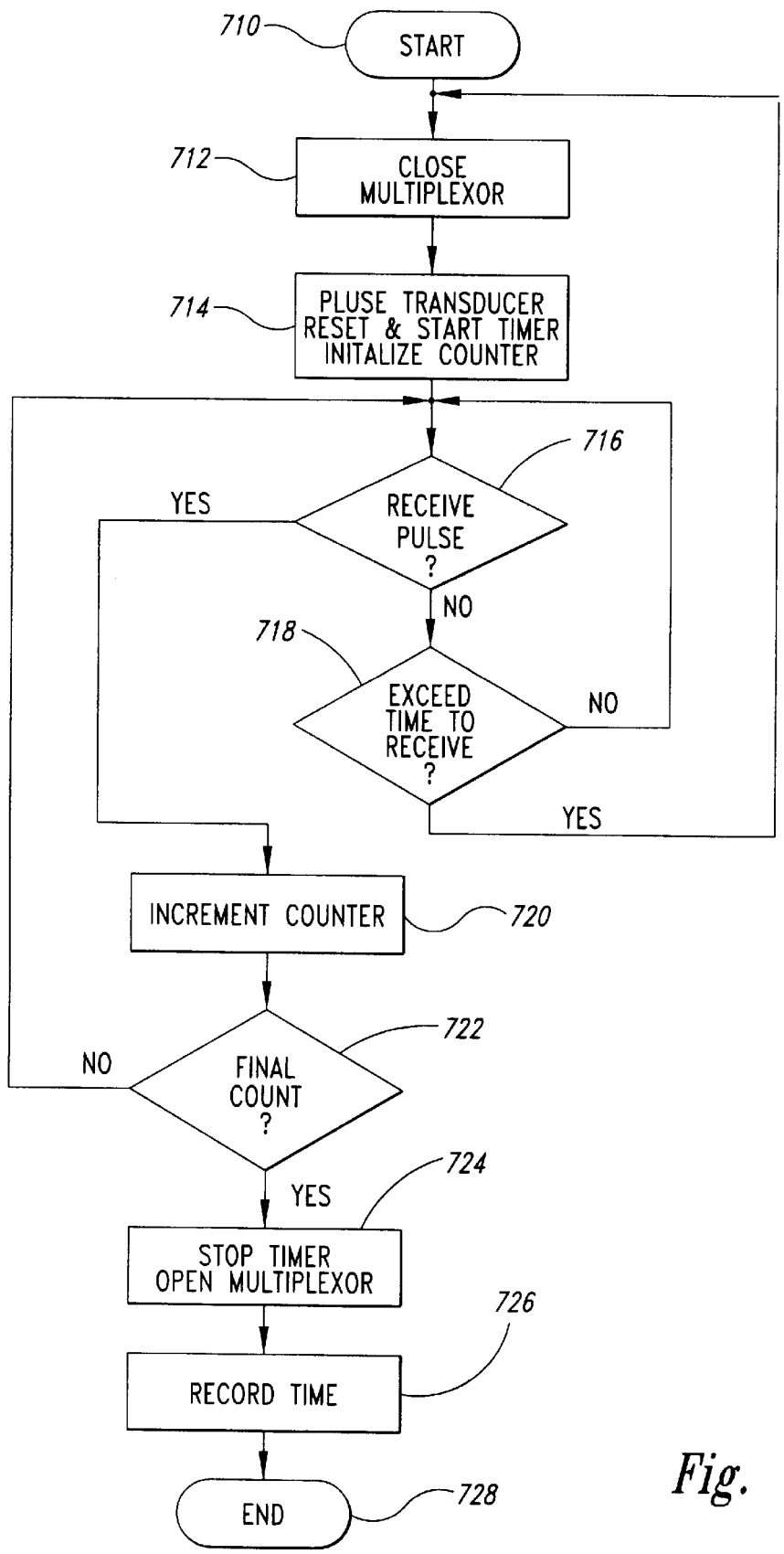
FIG. 7 is a flowchart of a procedure used by the processor depicted in FIGS. 2 and 3.

A flow diagram which summarizes the basic operations of the processor 210 concerning control and measurement is shown in FIG. 7. The process starts at step 710 and goes to step 712 where the processor 210 closes one of the analog switches 319 or 320 of the multiplexor 240. Next the process goes to step 714 where the processor 210 sends an electrical pulse signal to the selected transmitting transducer 130 or 140. The processor at this time also starts its internal timer 211a and initializes its internal counter 211b. The process then goes to decision step 716 where the processor 210 determines whether an electrical pulse signal has been received by the logic switch 220. If an electrical pulse signal has not been received the process branches under the "no" condition to step 718 where the processor determines whether a time limit (such as 100 μsec) has been exceeded. If the time limit has not been exceeded, the process branches under the "no" condition back to decision step 716. If the time allotted has been exceeded, the process branches under the "yes" condition back to step 712.

In decision step 716, if a pulse has been received, the process branches under the "yes" condition to step 720. In step 720 the processor 210 increments its internal counter 211b. The process then goes to decision step 722 where the processor 210 determines whether its internal counter has reached a final count stored in memory 211c. If a final count has not been reached, the process branches under the "no" condition back to decision step 716. If a final count has been reached, the process branches under the "yes" condition to step 724. In step 724, the processor 210 stops its internal timer 211a and opens the analog switch 319 or 320 of multiplexor 240 which the processor closed in step 712. The process then goes to step 726 where the processor 210 records in the memory 211c the time on its stopped internal timer. The processor 210 will then use this recorded time as described below to determine characteristics of a flow rate and fluid velocity. The process then goes to step 728 where the process ends.

When the steps described in FIG. 7 are implemented by the flowmeter 110 for both the upstream and downstream trains of ultrasonic pulses, two time measurements will be recorded by the memory 211c of the processor 210. The first time measurement, $T_U$, is the time required for the upstream pulse cycle including the associated ultrasonic pulses and electrical pulse signals to be completely sent and received. The second time measurement, $T_D$, is the time required for the downstream pulse cycle to be completely sent and received as described above. The system and method of the depicted embodiment of the flowmeter 110 determines $T_D$ and $T_U$ as described above using different devices and methods than prior art systems. The flowmeter 110 also uses $T_D$ and $T_U$ as described below in a different manner to determine flow rates and fluid velocities than the prior art systems and methods.

The flowmeter 110 of the present invention addresses a fundamental problem related to measurement of flow rates and fluid velocities that the prior art systems only address in a limited way. This is because the prior art systems do not fully address the issue of variability as it relates to the various physical dimensions and characteristics involved with measuring flow rate and fluid velocity. For example, in measuring flow rate and fluid velocity of a fluid flowing through the pipe 150, such things as the actual interior pipe diameter D and wall thickness W shown in FIG. 8 can differ from one pipe to another depending on variations in manufacturing tolerances and construction even though the specified diameter of all the pipes (e.g., 1-inch diameter) is the same.

Alignment and placement of the transducers 130 and 140 can also affect measurement. The transducers 130 and 140 having transducer wedges 820 and 830, respectively, can be positioned differently so that the path for the downstream pulse train 842 through the flowing fluid in the pipe 150 is different than the path for the upstream pulse train 844. These two paths 842 and 844 can differ due to their differing impingement angles for the pulse trains crossing the various interfaces between the transducers, pipe walls, and fluid as the pulse train leaves the transmitting transducer, enters the fluid and finally arrives at the receiving transducer. For instance, for the downstream path 842 the pulse train leaves the downstream transducer 140 at point 850 entering the wall of pipe 150 and leaves the wall of pipe 150 at point 852. The downstream pulse train then traverses the flowing fluid from point 852 to point 854 where it reenters the pipe wall traversing to point 856. At point 856 the downstream pulse train enters the upstream transceiver 130. Similarly, the upstream pulse train leaves upstream transducer 130 and enters the wall of the pipe 150 at point 860 traversing the wall and to the point 862. At point 862 the upstream pulse train enters the flowing fluid traversing it to point 864. At point 864 the upstream pulse train enters the wall of the pipe 150 again and traverses to point 866, where it enters the downstream transducer 140.

Figure 8:
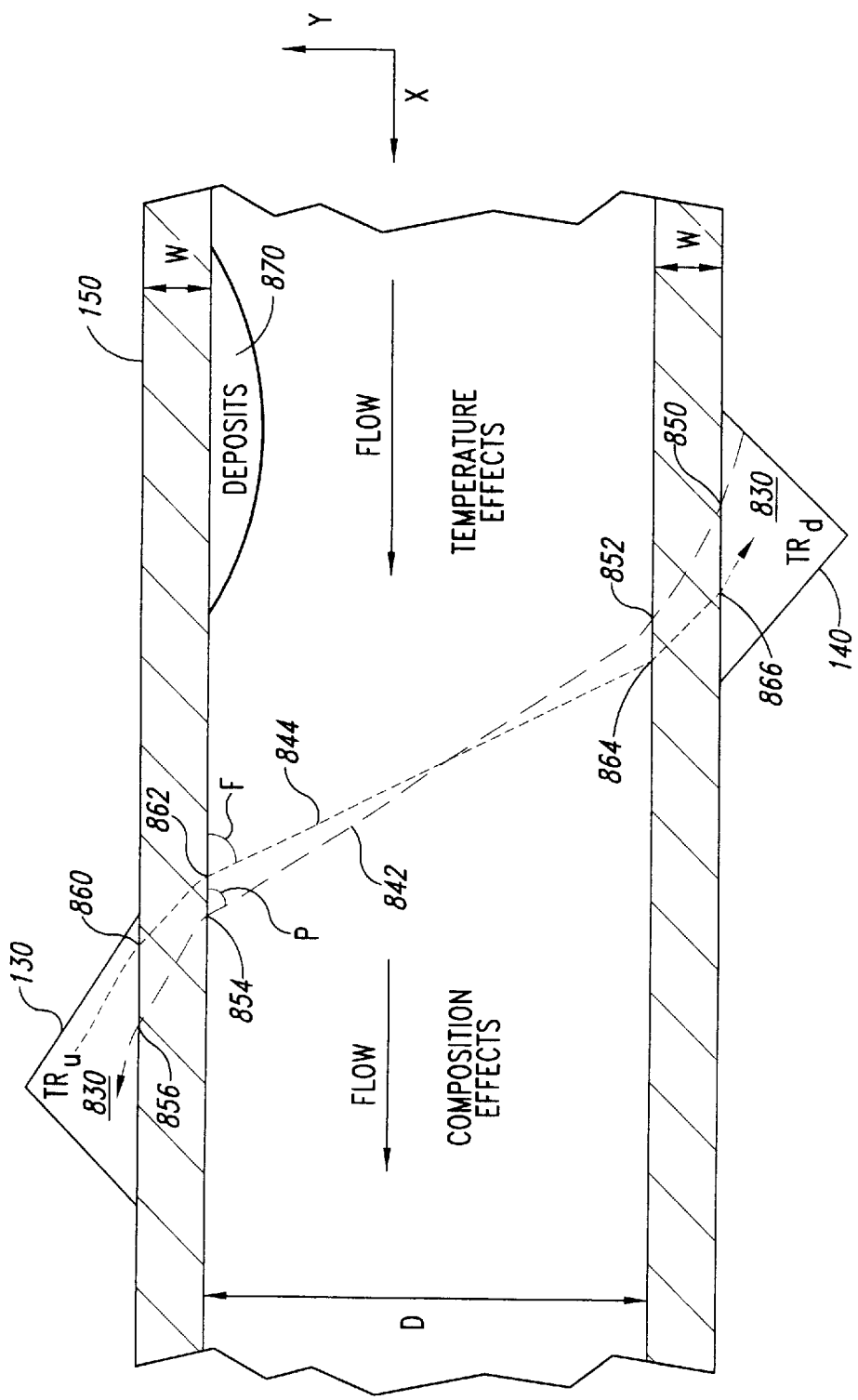
FIG. 8 is a cross-sectional view of the measurement environment associated with the present invention of FIG. 1.

If the impingement angles for the upstream pulse train and downstream pulse train are different at the various interfaces, then the path lengths for the pulse trains in the wall of the pipe 150 and the flowing fluid will be different, as is shown in FIG. 8 by comparing the paths. For instance, the total path length traversed by the downstream pulse train through the wall is the sum of the path length between point 850 and point 852 and the path length between point 854 and point 856. The total path length traversed by the upstream pulse train through the wall is the sum of the path length between point 860 and point 862 and the path length between point 864 and point 866. Upon comparison, the two total path lengths for both upstream and downstream paths traversing through the wall are different.

Also, the path lengths of both upstream and downstream pulse trains traveling through the fluid are different. For instance, the path in the fluid for the downstream pulse train between point 852 and point 854 is different than the path in the fluid for the upstream pulse train between point 862 and point 864, as shown in FIG. 8. The flowmeter 110 does not depend upon whether the paths of the upstream and downstream pulse trains are different. However, the depicted embodiment is robust enough to account for differences in path length of the upstream and downstream pulses, as distinguished from the prior art.

Not only can the interior diameter and wall thickness of the pipe 150 be different depending on the particular pipe used, deposits 870 can also build up inside the pipe 150, which effectively changes the interior diameter D. Prior art systems do not address this dynamic change in diameter of the pipe 150. Another example of variability in physical characteristics concerns changes in the acoustic velocity of a fluid (AFV). Acoustic velocity of a fluid is a critical parameter involved in determining flow rate and fluid velocity of the fluid. Acoustic velocity of a fluid is dependent on a number of factors including the temperature of the fluid, the type of fluid involved, and other compositional factors including whether there is foreign material in the fluid such as salts or whether the fluid is turbulent or has bubbles mixed in with the fluid.

Other dimensions and characteristics subject to variability include the electronics used. Variability in electronics is particularly directed to delays caused by the electronics. These delays are dependent upon the particular components used in the circuits so can have wide variation. Since time is a fundamental measurement in determining flow rate and fluid velocity, circuit delay directly affects this determination.

The prior art systems and methods of determining flow rates and fluid velocities do not have a general approach to variability. One aspect which distinguishes the present invention from these prior art systems is that the present invention determines flow rates and fluid velocities in a manner that allows variability regarding any given characteristic or dimension to be easily factored in. This makes the present invention adaptable to a wide variety of situations in which variability may change in the many physical dimensions, parameters, and characteristics involved. The depicted flowmeter 110 selects certain dimensions, parameters, and characteristics for which variability is accounted. However, the present invention is not limited to these particular physical dimensions, parameters, and characteristics. Instead, other embodiments treat additional dimensions, parameters and characteristics involved in flow rate and fluid velocity measurement so that if variability in any other dimension, characteristic, or parameter is significant, it is also accounted for similarly to those physical dimensions, characteristics, and parameters described below. This is far different than with prior art systems and methods. The prior art systems and methods do not account for variability in most dimensions, characteristics, and parameters. Further, the prior art systems and methods are not flexible in adapting to changes in the types of variability emphasized.

Unlike prior art systems, the flowmeter 110 of the present invention determines fluid flow rates and fluid velocities using a filter approach. This filter approach assumes that not only does flow rate or fluid velocity change, but other dimensions, characteristics, and parameters change as well, such as pipe diameter, acoustic velocity of the fluid, and factors involving any offsets to the time measurements. Although the depicted flowmeter 110 uses particular types of filters, the present invention is not limited to these particular filters, but rather in other embodiments other filters and filter systems are used, including, singularly or in combination, linear filters, non-linear filters, and neural network filters, along with appropriately configured parameter or validation filters further discussed below.

Many of the filters used in the embodiments are defined by a set of coefficients related to a filter equation. For application of the filters in low cost microcontrollers, one consideration is to keep the set of coefficients and form of the equation simple. For instance, in some embodiments, none of the components of the filter equations require a division operation. In these embodiments, filter weights for terms requiring division are low so that the terms are not highly significant to the filters in these embodiments. Network filters such as neural network filters are used in other embodiments with complex conditions including great degrees of variability related to multiple parameters. However, the network filters require greater computation time and more complex processing of mathematics. Multi-layer feed-forward network filters can provide extended ranges in parameter variability and accuracy, and are used in other embodiments where the expense of added computational complexity is justified.

The methods used by the embodiments of the present invention to configure linear filters use matrices of the form A*x=b. The term "A" of this equation is a matrix of values based on algebraic expressions involving $T_U$ and $T_D$ (the time measurements for the upstream and downstream trains of pulses as described above). The term "x" of this equation is a vector of filter coefficients that are to be solved. The term "b" of this equation is a vector involving the parameter of interest (e.g. flow rate, pipe diameter, fluid velocity, etc.). This equation describes both finite impulse response (FIR) and infinite impulse response (IIR) filters. The difference between the two filters is that the IIR filter uses measurements at different times and the FIR filter uses measurements from a single time. If the matrix A and the vector b are given, there are many methods to solve for the vector of filter coefficients, x, such as Gauss-Jordan Elimination, computing the inverse of a matrix, singular value decomposition, etc. Many of these methods are included in the book, Numerical Recipes (The Art of Scientific Computing) by William H. Press, Brian P. Flannery, Saul A. Teukolsky, and William T. Vetterling. Published by Cambridge University Press, 1989, 701 pages. There are different versions of the book for Fortran, C, Pascal, and Basic programming languages.

Many neural networks used by some of the embodiments involve multiple layers of FIR filters with various transfer equations serving as interfaces between the layers of filters. Often the transfer equations are non-linear such as those comprising a sigmoid function. A general purpose program to determine the coefficients of a multi-layer feed forward neural network is provided in Signal and Image Processing with Neural Networks by Timothy Masters, 1994, Publisher John Wiley & Sons, Inc., 417 pages. Another useful reference is the book Neural Network Toolbox For Use With MATLAB by Howard Demuth and Mark Beale published by Mathworks, Inc.

A general linear filter is expressed as $$y_n = \sum_{k=0}^{M} c_k x_{n-k} + \sum_{j=1}^{N} d_j y_{n-j}. \quad (1)$$

When applied to determining flow rates and fluid velocities, $y_n$ is the estimated parameter such as the flow rate, fluid velocity diameter, etc. The parameters $x_k$ are a series of terms involving the time measurements $T_U$ and $T_D$ where each term is an expression containing $T_U$ and/or $T_D$. The filter coefficients $c_k$ and $d_j$ are determined by solving for these coefficients under a range of conditions as further described below. When N=0 the filter is classified as a nonrecursive or finite impulse response (FIR) filter. When N>0 the filter is classified as a recursive or infinite impulse response (IIR) filter. M is the total number of $x_K$ terms involving the time measurements $T_U$ and $T_D$.

The range of conditions to use to solve the filter coefficients $c_k$ and $d_j$ can be generated by the following equations:

$$T_D = \frac{L_{PT}}{V_{AP} * \cos(p)} + \frac{D}{V_{AF} * \cos(f) + V_F * \sin(f) * \cos(f)} \quad (2)$$

$$T_U = \frac{L_{PT}}{V_{AP} * \cos(p)} - \frac{D}{V_{AF} * \cos(f) - V_F * \sin(f) * \cos(f)} \quad (3)$$

$L_{PT}$ is the total path that the ultrasonic pulse train travels through both the pipe and the front part of the transducer before hitting the electrical components that convert the ultrasonic pulse train into electrical pulse signals. The angles "p" and "f" are angles related to the paths of ultrasonic pulse trains measured from the X axis along the length of the pipe 150 as shown in FIG. 8. The parameters $V_{AF}$ and $V_{AP}$ are the acoustic velocities for sound pulses traveling in the fluid and the pipe 150 respectively. These equations also were formulated under the approximation that the acoustic velocity of the pipe is equal to the acoustic velocity of the portion of the transducer in which the ultrasonic pulse train travels. The parameter, D, is the interior diameter of the pipe 150. The parameter $V_F$ is the flow rate and fluid velocity of the flowing fluid.

One of the angles "p" or "f" can be derived from the other by using Snell's Law which results in the following expression:

$$f = \sin^{-1}\left(\frac{\sin(p * V_f)}{V_{PT}}\right) \quad (4)$$

Unlike prior art systems, to determine the flow rate of the fluid (FR), the flowmeter 110 using its filter approach does not need to distinguish between changes in diameter of the pipe 150, changes in acoustic velocity of the fluid, changes in the flow rate, or changes in other parameters. Instead, the flowmeter 110 creates a filter that is valid over a range of uncertainties for each parameter of interest such that propagation of errors is minimized.

A simple example of a FIR filter uses only $T_U$ and $T_D$ for the $x_n$ series of terms and sets, N=0 and sets M=2 in Equation (1). Equations (2)–(4) are used to generate $T_U$ and $T_D$ for fluid velocities of 0 to 100 m/sec, a pipe diameter D of 0.5", acoustic velocity in water, $V_{AF}$, of 0.058 in/μsec, acoustic velocity in the pipe 150 and transducers 130 and 140, $V_{AP}$, of 0.094 in/μsec, pipe+transducer wedge thickness 0.92", and transducer wedge angle "p" of 80°. As used herein, "m/sec" is meters per second, "in/μsec" is inches per microsecond and "in/sec" is inches per second. The pipe 150 and transducer wedges 820 and 830 are assumed to be made from the same material and have the same acoustic velocity. From these specifications the following matrix equation is generated of the form A*x=b, where "A" is the data matrix, "x" is the filter coefficient matrix, and "b" is the vector containing the parameter of interest, in this case fluid velocity.

| A | | | x | b |
|---|---|---|---|---|
| $T_U(\mu sec)$ | $T_D(\mu sec)$ | Constant | | Velocity in/sec |
| 67.2169 | 67.2169 | 1 | | 0. |
| 67.2175 | 67.2163 | 1 | \|a1\| | 5.0 |
| 67.2180 | 67.2158 | 1 | *\|a2\| = | 10.0 |
| 67.2186 | 67.2152 | 1 | \|a3\| | 15.0 |
| 67.2192 | 67.2146 | 1 | | 20.0 |
| 67.2197 | 67.2141 | 1 | | 25.0 |
| 67.2203 | 67.2135 | 1 | | 30.0 |
| 67.2209 | 67.2129 | 1 | | 35.0 |
| 67.2214 | 67.2124 | 1 | | 40.0 |
| 67.2220 | 67.2118 | 1 | | 45.0 |
| 67.2226 | 67.2112 | 1 | | 50.0 |
| 67.2232 | 67.2106 | 1 | | 55.0 |
| 67.2237 | 67.2101 | 1 | | 60.0 |
| 67.2243 | 67.2095 | 1 | | 65.0 |
| 67.2249 | 67.2089 | 1 | | 70.0 |
| 67.2254 | 67.2084 | 1 | | 75.0 |
| 67.2260 | 67.2078 | 1 | | 80.0 |
| 67.2266 | 67.2072 | 1 | | 85.0 |
| 67.2271 | 67.2067 | 1 | | 90.0 |
| 67.2277 | 67.2061 | 1 | | 95.0 |
| 67.2283 | 67.2055 | 1 | | 100.0 |

The column of 1's in the data matrix provides for an offset variable in the linear equation. The data matrix contains the learning range of the simple filter in this example. A variety of numerical algorithms exist to determine the filter coefficients a1, a2, a3. One well-known technique is singular value decomposition (SVD) which will be discussed in detail below. Using SVD generates the following singular values (e.g., one singular value for each value in the left-hand data matrix):

| No. | Singular Value |
|---|---|
| 1 | 435.6394 |
| 2 | 0.02231 |
| 3 | 6.63641e-8 | and the following equation for fluid velocity:

$$\text{Velocity (in/sec)} = 4389.726\ T_U - 4403.726\ T_D + 928.8836 \quad (5)$$

with an associated root-mean-square (rms) error in fluid velocity of 0.00000236 in/sec. All the singular values were used in deriving Equation (5). Note that the coefficients in this simple filter case for $T_U$ and $T_D$ are similar to the approximation made in the prior art for flow rate and fluid velocity calculations, e.g., Velocity=$K^*(T_U-T_D)$. However, the prior art fundamentally treats the measurement problems involved differently than the filter approach of the present invention, so the prior art is limited to a level of solution that can be approximated by a simple filter.

The last singular value No. 3 is an artifact of the machine precision and to give robustness to the determination of fluid velocity should be zeroed in determining the equation for fluid velocity. If the last singular value No. 3 is zeroed, then the following equation for fluid velocity results:

$$\text{Velocity (in/sec)} = 4396.809\ T_U - 4396.810\ T_D - 0.06852 \quad (6)$$

with an rms error in velocity of 0.0000137 in/sec. The gains for $T_U$ and $T_D$ are different now by only 1 part in $10^6$ which is close in form to equations used in the prior art. However, again the equations of the prior art are limited since they are based on other approaches than the filter approach of the present invention. This is to be expected since in this example it is assumed that there is no variability in any of the parameters, except flow rate and fluid velocity, which is similar to prior art treatments.

As another example, now the acoustic velocity in the fluid is not constant but instead ranges from 0.038 to 0.068 in/μsec in 0.003 in/μsec increments. The above input data matrix, A, changes to include conditions for all combinations of 11 velocities and 11 acoustic fluid velocities spanning the range of 0.038 to 0.068. Thus, there is an increase in the number of input cases to 11*11 or 121. Solving for filter coefficients reveals now the best fluid velocity estimate is:

$$\text{Velocity (in/sec)} = 3989.98^*T_U - 3993.69^*T_D + 254.66 \quad (7)$$

With an rms error in velocity of 3.44 in/sec. Now the gains for $T_U$ and $T_D$ are different by 1 part in $10^3$. If Equation (5) or (6) is used above to determine flow, there is an rms error in velocity estimates that is twice that obtained in using Equation (7). However, as we take on greater uncertainty in the parameters in Equations (2)–(4) the differences in the coefficients $T_U$ and $T_D$ become increasingly different. The prior art assumes minimal uncertainty in the determination of flow rates and fluid velocity in Equations (2)–(4). To assure robustness in the determination of flow rates and fluid velocities it is necessary for the prior art to either take measurements in addition to $T_U$ and $T_D$ such as measurement D directly so that an analytical solution is possible. The flowmeter 110 of the present invention uses only measurements of $T_D$ and $T_U$ during operation rather than additional measurements such as measuring D directly. The flowmeter 110, rather than using additional analytical equations, trains its filters over the range of uncertainty in the applicable dimensions, characteristics or parameters and thereby functions in variability in flow rate and fluid velocity. Robustness is also added to the filters by adding non-linear terms in $T_U$ and $T_D$ such as $T_U^2$ or $T_U/T_D$.

Non-linear filters are used as well in other embodiments of the invention, such as non-linear filters as functions $y_n$ with coefficients $a_j$. In one embodiment, y(x) is a transcendental function:

$$y(x) = a_1 \sin(a_2 x). \quad (8)$$

In another embodiment y(x) is a Gaussian peak plus a quadratic background, e.g., $$y(x) = a_1 \exp(-0.5((x-a_2)/a_3)^2) \quad (9)$$

Other embodiments include other functions, where some of the parameters cannot be separated into different terms of a sum as in the linear equations above.

The following equation is used by a further embodiment to determine flow. In this further embodiment, a1, a2, a3, and a4, are solved to minimize effects from variability in acoustic velocity, interior pipe diameter, pipe acoustic velocity, flow turbulence, pipe thickness, timer accuracy, and electronic delays on flow rate and fluid velocity determinations.

$$\text{Fluid Velocity } (T_U, T_D) = (a1^*T_U - a2^*T_D)/(a3^*T_U + a4^*T_D) \quad (10)$$

The coefficients of nonlinear equations, such as the coefficients a1–a4 of Equation (10), can be solved by several techniques, including a grid search, gradient least squares search, or a parabolic expansion of Chi Square. See "Data Reduction and Error Analysis for the Physical Sciences" by Philip R. Bevington, 1969, McGraw Hill Book Co., pp. 336.

Neural networks are utilized by other embodiments of the invention as another class of digital filters to determine flow rates and fluid velocities from $T_U$ and $T_D$ measurements. For example, one embodiment uses a two-layer network to determine flow rate and fluid velocity in the presence of significant variation in acoustic fluid velocity and pipe diameter. The present invention is not limited to any group of neural networks and is not limited to any group of methods for a neural network to learn, but instead uses any one of the forms of neural networks in at least one of its embodiments along with any one of the methods for a neural network to learn in at least one of its embodiments. There are a wide range of neural networks and methods of learning, including, but not limited to, simulated annealing, gradient descent, momentum learning, adaptive learning, etc. For example, one embodiment uses a two layer feedforward network with a sigmoid transfer function to normalize the data between the output of the first layer and second layers of the neural network. Each node in the first layer of the network is a linear digital filter as described by Equation (1) with N=0. This particular embodiment uses simulated annealing to search for the optimal weightings associated with the linear filters used on the input variables. The advantage of neural networks, especially multi-layer networks, over linear filters, is their increased ability to subdue or minimize propagation of nonlinear noise arising from uncertainty in characteristics, dimensions or parameters in the Equations (2)–(4) of flow rate and fluid velocity measurements.

The following neural net was trained with a matrix of 385 cases generated by Equations (2)–(4) and the following variabilities: fluid velocity=0 to 100 in/sec in steps of 10 in/sec, acoustic fluid velocity=0.03 to 0.09 in/μsec in steps of 0.01 in/μsec, and pipe diameter=0.4" to 0.6" in steps of 0.04". The training data was comprised of 11 flow rates, 7 acoustic velocities, and 5 pipe diameters or 11*7*5=385 cases. The results after training the network for four days using the above training data follows:

| Velocity Estimate From Neural Net | | |
|---|---|---|
| Low | High | Actual (in/sec) |
| −1.46 | 1.91 | 0 |
| 9.53 | 10.15 | 10 |
| 19.29 | 20.53 | 20 |
| 29.31 | 30.47 | 30 |
| 39.20 | 40.64 | 40 |
| 48.41 | 50.78 | 50 |
| 57.86 | 60.93 | 60 |
| 68.97 | 71.03 | 70 |
| 78.58 | 81.30 | 80 |
| 87.77 | 91.45 | 90 |
| 97.12 | 101.84 | 100 |

The results from the neural net out-performs what is possible from a linear digital filter at the expense of increased computation to determine fluid velocities. To get the same performance from linear filters it is necessary to partition the filters into multiple filters to handle different ranges in flow rates and fluid velocities as is done in further embodiments discussed below. The number of nodes used in the second layer of the depicted neural network is particular to this embodiment of the present invention. Further embodiments increase accuracy by including more derivatives of $T_U$ and $T_D$ measurements and by adding additional nodes in the second layer.

For the embodiments discussed above, training of the filters and networks are performed in a supervised manner prior to application. Other embodiments have the coefficients of the networks adapt in real time to the conditions of flow through unsupervised training, as for example, involving a parameter filter discussed further below. In other embodiments, adaptive learning is implemented by a series of validation filters that check for a range of conditions. For example, one embodiment determines which standard pipe size is being used by including a series of validation filters that are appropriate for standard pipe sizes. Additionally, further embodiments adapt filter coefficients to the range of local variability in flow rate and fluid velocity estimates by creating a data base that encompasses the range of measurements.

Many of the embodiments rely to a certain extent on Equations (2)–(4) to generate much of the data for training the filters. However, there are factors affecting flow rate and fluid velocity that are not expressed by these Equations (2)–(4). For example, determination of flow rate is directly based on the area averaged fluid velocity. The area averaged fluid velocity is typically 0.75 that of the measured fluid velocity for laminar flow in smooth pipes. The inner pipe texture affects the relation between the measured fluid velocity and the area averaged fluid velocity. Additionally, turbulence has an impact on the $T_U$ and $T_D$ measurements that are also not accounted for by Equations (2)–(4). The effect of turbulence is to bring the measured fluid velocity closer to that of the area averaged fluid velocity associated with high Reynolds numbers, e.g., >4000. Thus, in addition to relying on Equations (2)–(4), training data must also be based on measurements of $T_U$ and $T_D$ associated with flows calibrated to a recognized scientific standard. It is not possible to thoroughly optimize filter performance based on data derived exclusively from Equations (2)–(4). However, once the operational conditions are represented in the data matrices using both theoretical equations and empirical data, it is possible to create a sequence of filters to minimize the effect of extrinsic factors, such as turbulence and pipe texture so that flow rate and fluid velocity values determined from $T_U$ and $T_D$ measurements are reliable.

These extrinsic factors also include bubbles, variation in temperature, different salts/solutes and different fluids that affect the acoustic velocity in the fluid. Temperature also affects acoustic velocity in the pipe. From Equations (2)–(4), changes in measurements of $T_U$ and $T_D$ are affected differently by changes in the acoustic velocity in the pipe 150 compared to changes in acoustic velocity in the fluid because fluid flow only affects sound traveling through the fluid and does not affect sound traveling through the pipe. Acoustic velocity changes in the pipe 150 will be expressed as a calibration offset in $T_U$ and $T_D$ measurements.

Proactive calibration increases the ranges of operational conditions for which the ultrasonic flowmeter 110 remains calibrated. Proactive calibration is realizable for the flowmeter 110 because filter techniques accommodate the uncertainty involved with wide ranges of operational uncertainty. As long as the degrees of the uncertainties for dimensions, parameters, and characteristics associated with calibration apply to conditions of operation the flowmeter 110 is calibrated to within the specified rms errors and/or range in errors. As part of proactive calibration, operational uncertainties include a common offset in $T_U$ and $T_D$, a differential offset in $T_U$ and $T_D$, and timer error. Part of the proactive calibration depends on consistent manufacturing of transducer angles within ±0.2 degrees and fixed distances between transducers to within ±0.01". Too large of uncertainties result in little or no resolution of flow rates and fluid velocity from the filters. It is in the careful selection of uncertainties associated with the operational environment and the creation of filters that advance accurate estimates of flow rates and fluid velocities. The depicted flowmeter 110 has included some of the uncertainties in the implementation of filters. Further embodiments are configured to incorporate other uncertainties to determine flow rates and fluid velocities in the presence of uncertainties. The flowmeter 110 incorporates other uncertainties by including related data in the data matrix, solving for new filter coefficients, and relating the uncertainties to a hierarchy of validation and parameter filters or neural networks.

Another embodiment of the present invention serves as an example of proactive calibration. This embodiment develops a set of filters to determine flow rate and fluid velocity for a range of ±0 to 100 in/sec under a limited range of variability in acoustic velocity in the fluid (0.03 in/$\mu$sec–0.09 in/$\mu$sec, thickness of pipe (±20%), cross sectional diameter of flow (±10%), differential electronic delay (±20%) and absolute electronic delay (±25%). In this embodiment no variability is allowed for the angle of the acoustic path between $T_U$ and $T_D$. This embodiment is an underdetermined problem in that the number of measurements ($T_U$ and $T_D$) is less than the number of unknowns (i.e., fluid velocity, acoustic velocity in the fluid, thickness of pipe, cross-sectional diameter of flow, differential error in recorded time and absolute error in recorded time).

In measuring flow rate and fluid velocity in the depicted flowmeter 110 there are two main components, namely, a differential error in recorded time and an absolute error in recorded time for the measurements of $T_U$ and $T_D$. The differential error in recorded time signifies an unequal time between the upstream and downstream directions due to electronics and/or subtle differences in the acoustic path. Under this type of error, when flow rate and fluid velocity is zero, the time measurement for $T_U$ is not equal to the time measurement for $T_D$. An absolute error in recorded time can arise from factors including the internal timer 211a of the processor 210 being out of calibration, or the diameter or the thickness of the pipe 150 or the thickness of the transducers 130 and 140 being is different than expected. Both differential and absolute errors in recorded time can also be caused by inconsistent triggering of the next pulse in a pulse train by the logic switch 220 and comparator 260 combination.

Two types of filters are used in the flowmeter 110 as programmed in the processor 210 to determine flow rate and fluid velocity, namely, a validation filter and a parameter filter. Both filters use the same input, namely, the measurements for $T_U$ and $T_D$. The validation filters determine by using the $T_U$ and $T_D$ measurements whether the assumptions made regarding variability used to construct the filters to determine flow rate and fluid velocity are valid. Several validation filters are used in some of the embodiments of the invention to determine sets of valid assumptions given the particular conditions for the flowmeter 110. These embodiments then use filters constructed under a valid set of variabilities with the smallest range of variabilities. Other embodiments, including the depicted flowmeter 110, perform a single check to see if a set of variabilities is valid under the conditions involved with the measurement of $T_U$ and $T_D$. After the single validation check is performed, these embodiments then use parameter filters to assist in selecting a particular filter to determine the flow rate or fluid velocity.

The parameter filters refine estimates of flow conditions. The parameter filters are applied in a sequence. The sequence is determined to account for variability in variables most orthogonal to the full set of variables. As variables are estimated, they are then used in subsequent parameter filters to further refine estimates of flow conditions. As an example, it is difficult to separate the acoustic velocities in the fluid and pipe 150 and interior diameter of the pipe using a single filter with only $T_U$ and $T_D$. However, in some embodiments, the fluid velocity is determined with a separate filter and then applied to another filter to determine the flow diameter. This results in good separation between the acoustic velocities and flow diameter of the pipe 150.

Figure 9A:
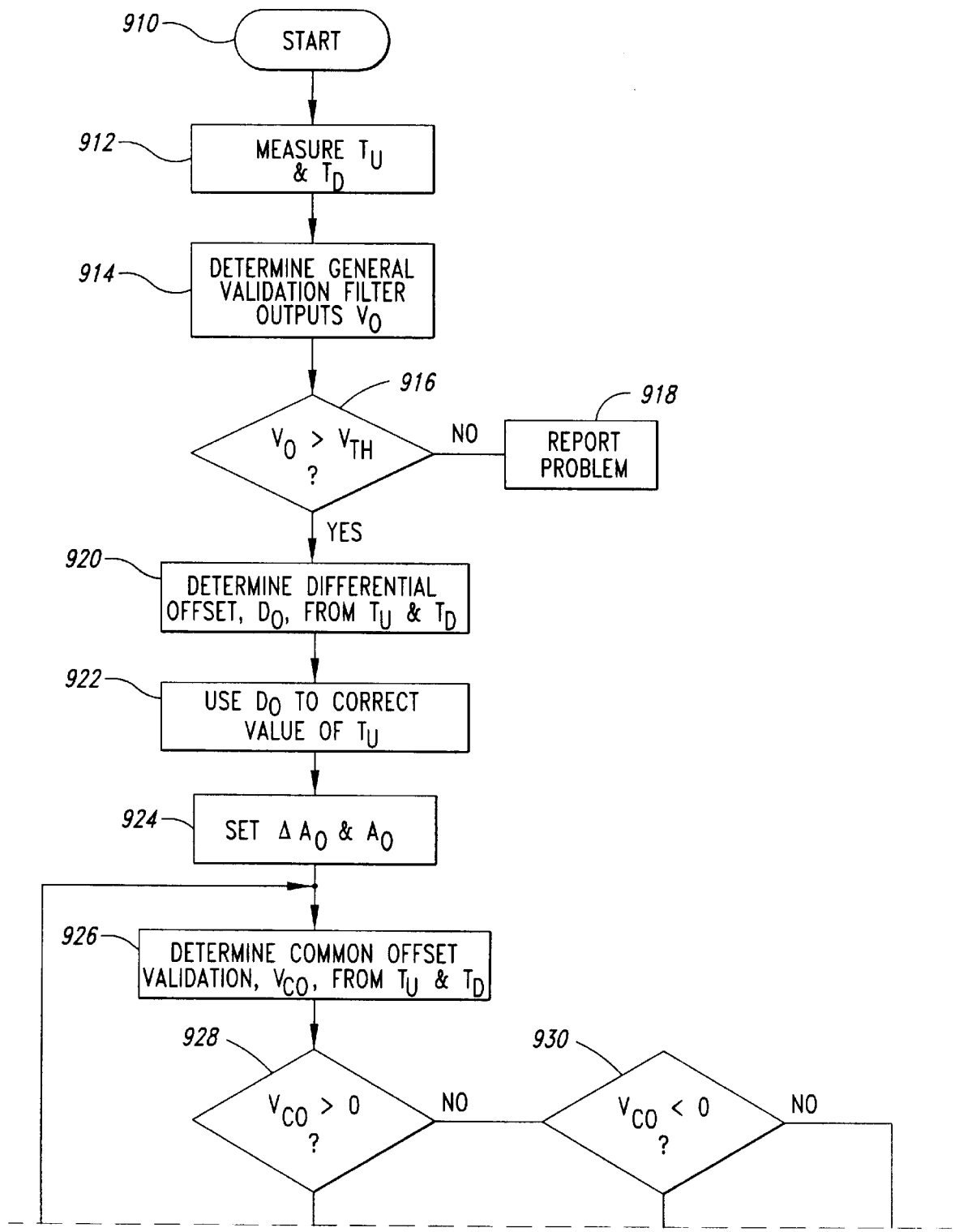
FIGS. 9A and 9B show a flowchart of a procedure used by the processor of FIGS. 2 and 3 to correct for common and differential offset errors in $T_U$ and $T_D$.
Figure 9B:
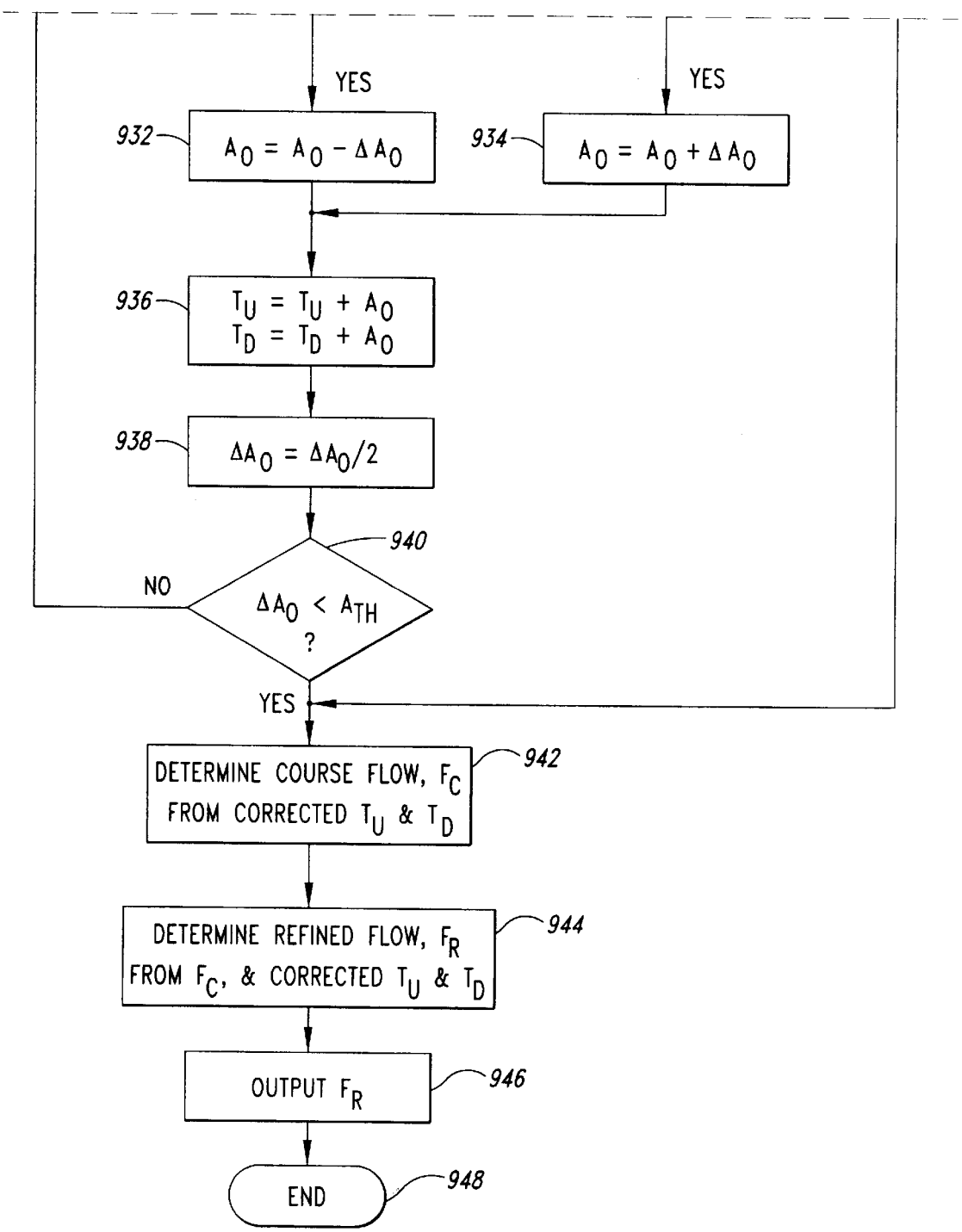

The present embodiment applies validation and parameter filters in the following exemplary manner as shown in the flowchart of FIGS. 9A and 9B. The flowmeter 110 starts at step 910 and goes to step 912 where both $T_U$ and $T_D$ are measured. The procedure then goes to step 914 where the processor 210 determines a validation filter output, $V_O$, using the following equation:

$$V_O = a*T_U + b*T_D + c*T_U^2 + e*T_U/T_D + f*T_U^3 + g*T_D^3 + h \quad (11)$$

The processor 210 uses the validation filter equation (11) to determine whether the measured $T_U$ and $T_D$ were measured in conditions in which presumed variabilities are valid. In step 916, the validation filter output, $V_O$ is checked by the microprocessor 210 to see whether it is greater than a threshold $V_{TH}$. If $V_O$ is not greater than $V_{TH}$, the decision step 916 branches under the "no" condition to step 918 where the flowmeter 110 generates a problem report. Typically, the validity threshold, $V_{TH}$ is equal to 0.5. If in step 916 $V_O$ is greater than $V_{TH}$, the decision step 916 branches under the "yes" condition to step 920. In step 920, the processor 210 determines a differential offset, $D_O$, from the measured $T_U$ and $T_D$. In the represented embodiment, parameter filter Equation (12) is used for this determination.

$$D_O = a*T_U + b*T_D + c*T_U^2 + e*T_U/T_D + f*T_U^3 + g*T_D^3 + h \quad (12)$$

By its nature, a parameter filter corrects values of measured parameters. In this case, Equation (12) is used to determine a differential offset, $D_O$. This differential offset, $D_O$ is added to the measured $T_U$ to correct the value of $T_U$ due to differential offset errors. The procedure uses $D_O$ to correct the measured value of $T_U$ in step 922 and then goes to step 924. In step 924, the procedure sets two variables $\Delta A_O$ and $A_O$ to initial values. In an exemplary embodiment, $\Delta A_O$ is set to 25 $\mu$sec and $A_O$ is set to 0 $\mu$sec. The procedure then goes to step 926 where Equation (13) is used for another validation filter, this time regarding common offset error.

$$V_{CO} = a*T_U + b*T_D + c*T_U^2 + e*T_U/T_D + f*T_U^3 + g*T_D^3 + h \quad (13)$$

After the common offset validation, $V_{CO}$, is determined by the processor 210 from $T_U$ and $T_D$ in step 926, the procedure then goes to decision step 928 to determine whether $V_{CO}$ is greater than 0. If $V_{CO}$ is not greater than 0, the procedure branches under the "no" condition to decision step 930. If $V_{CO}$ is greater than 0, the procedure branches under the "yes" condition to step 932. In step 932, the value for $A_O$ is decreased by an amount equal to $\Delta A_O$. If $V_{CO}$ is less than 0, then decision step 930 branches under the "yes" condition to step 934. In step 934, the value for $A_O$ is increased by an amount equal to the value of $\Delta A_O$. Both steps 932 and 934 then proceed to step 936 where the value of $A_O$ is added to $T_U$ and also $T_D$. The procedure then goes to step 938 where the value for $\Delta A_O$ is replaced by $\Delta A_O$ divided by 2. The procedure then goes to decision step 940 where the processor 210 determines whether $\Delta A_O$ is less than a threshold amount, $A_{TH}$. This threshold amount, $A_{TH}$, is associated with the resolution of the internal timer 211a of the processor 210. For one exemplary embodiment, $A_{TH}$= 0.01 μsec. Once refinements to $T_U$ and $T_D$ related to absolute offset errors of time measurements are below the resolution of the internal timer of the processor 210, further refinements to $T_U$ and $T_D$ related to absolute offset errors of the time measurements will cease from producing any further increases in accuracies. For instance, if a pulse train has 10,000 pulses, accuracy regarding determination of absolute time is one part in 100,000 or very near the resolution of the internal timer 211a of the processor 210. If in decision step 940, the processor 210 determines that $\Delta A_O$ is less than $A_{TH}$, the procedure branches under the "yes" condition to step 942 and otherwise branches back under the "no" condition to step 926. In decision step 930, if $V_{CO}$ is not less than 0, the decision step branches under the "no" condition to step 942. In step 942, the processor 210 uses Equation (14) to determine a coarse value for flow, $F_C$ from the corrected values of $T_U$ and $T_D$.

$$F_C = a*T_U + b*T_D + *T_U^2 + e*T_U/T_D + f*T_U^3 + g*T_D^3 + h \quad (14)$$

In the representative embodiment, Equation (14) is used for the range of flow rates from 0 to 25 gal/min. As used herein, the abbreviation "gal/min" is gallons per minute. In an alternative embodiment, fluid velocities are used where the range is from 0 to 100 in/sec. The flow rate using a coarse parameter filter over the range of 0 to 25 gal/min has an rms error for a flow rate of 1 gal/min. using the corrected $T_U$ and $T_D$ from the previous steps. Once the coarse flow rate, $F_C$, is determined in step 942, the procedure goes to step 944. In step 944, the processor 210 determines refined flow rate, $F_R$, from $F_C$ and the corrected $T_U$ and $T_D$. Refined flow rate, $F_R$, is determined using a set of Equations (15) with the appropriate value for coarse flow rate, $F_C$.

$$F_R = a*T_U + b*T_D + c*T_U^2 + e*T_U/T_D + f*T_U^3 + g*T_D^3 + h(0-5 \text{ gal/min}) \quad (15A)$$

$$F_R = a*T_U + b*T_D + c*T_U^2 + e*T_U/T_D + f*T_U^3 + g*T_D^3 + h(5-10 \text{ gal/min}) \quad (15B)$$

$$F_R = a*T_U + b*T_D + c*T_U^2 + e*T_U/T_D + f*T_U^3 + g*T_D^3 + h(10-15 \text{ gal/min}) \quad (15C)$$

$$F_R = a*T_U + b*T_D + c*T_U^2 + e*T_U/T_D + f*T_U^3 + g*T_D^3 + h(15-20 \text{ gal/min}) \quad (15D)$$

$$F_R = a*T_U + b*T_D + c*T_U^2 + e*T_U/T_D + f*T_U^3 + g*T_D^3 + h(20-25 \text{ gal/min}) \quad (15E)$$

For example, if in step 942, a coarse flow rate, $F_C$, was determined by the processor 210 to have a value of 22 gal/min, the procedure in step 944 would then use Equation (15D) to determine a value for refined flow rate, $F_R$. If in step 942, the procedure determines a value for coarse flow rate, $F_C$ to be at a border of two ranges, for instance, 15 gal/min, either equation could be used, for instance Equation (15B) or Equation (15C). The refined flow rate typically has an rms error of approximately 0.005 gal/min. After refined flow rate, $F_R$, is determined in step 944, the procedure goes to step 946 where the processor 210 outputs the refined flow rate $F_C$ via output 211d to a display device, computer device or other data handling device. The procedure then ends at step 948. The procedure as outlined in FIG. 9 is used by the exemplary flowmeter 110 of the present invention. However, other embodiments correct for absolute and offset errors in $T_U$ and $T_D$ by using other filters from the classes of linear, nonlinear, and/or neural network filters and by using other search methods to arrive at corrected values for $T_U$ and $T_D$.

As described above, both validation and parameter filters were used to refine measurements and arrive at a final result for flow rate or fluid velocity. Generally, a validation filter is used instead of a parameter filter when the value of a term referred to as "contrast" is relatively small between the particular parameter of interest and other parameters causing variation in $T_U$ and $T_D$ measurements. Contrast is defined as the sine of the angle between n-dimensional coefficient vectors comprising filters that determine each parameter.

After refined flow rate is determined, the effective diameter of the pipe 150 is determined using Equation (16).

$$D = a*T_U + b*T_D + c*T_U^2 + e*T_U/T_D + f*T_U^3 + g*T_D^3 + h*F_R + g/F_R + h \quad (16)$$

By determining the effective diameter of the pipe 150, any sludge material can be detected building up in the pipe.

Figure 10:
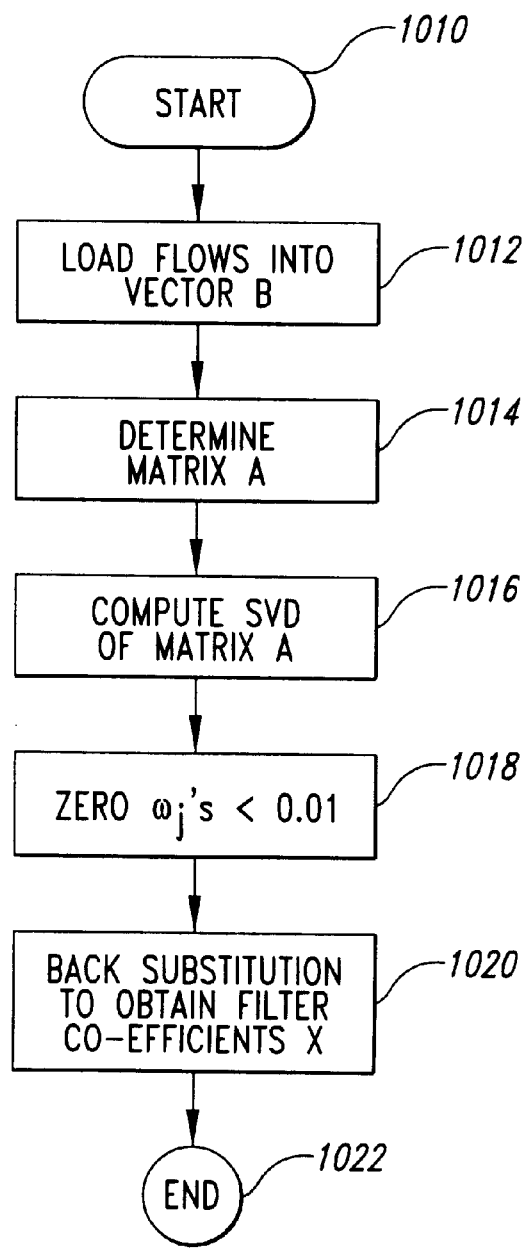
FIG. 10 is a flowchart of a general procedure of singular variable decomposition used to determine coefficients in non-linear filter equations used by the processor of FIGS. 2 and 3.

As can be appreciated by the foregoing discussion, determination of the coefficients of the various filters is important to the success of determining flow rates and fluid velocities. Thus, a review of the general procedures used to determine these coefficients will now be described, starting with a general procedure used by some of the embodiments to determine coefficients for linear filters. As illustrated in FIG. 10, this procedure begins with start step 1010 and goes to step 1012. In step 1012, the parameter of interest, typically flow rates, are loaded into vector B. If the flow rate is the parameter of interest, flow rates can be actual physical flow, measured by standardized meters or theoretical flow rates derived from Equations (2)–(4). A size of the vector B depends on how many terms are used for the linear filter as generally expressed by Equation (1). For instance, Equation (15) has seven coefficients and thus a vector B in this case would have 7 terms or dimensions.

After the vector B is determined, the procedure goes to step 1014 where the corresponding matrix A is determined. Matrix A is determined by using values for $T_U$ and $T_D$ corresponding to values used for parameter of interest, such as flow rates which were loaded into the vector B in step 1012. Values for $T_U$ and $T_D$ are determined in the same manner as the values for flow rates were determined in step 1012. For instance, if the values for flow rates which were loaded into the vector B were determined by empirical methods, the value for $T_U$ and $T_D$ would also be determined by the same empirical methods. On the other hand, if values for other flow rates loaded also into vector B were determined theoretically be Equations (2)–(4), then the corresponding values for $T_U$ and $T_D$ would also be determined by Equations (2)–(4). Thus, the parameter of interest such as each value for flow rate or fluid velocity has a corresponding pair of values for $T_U$ and $T_D$.

Once values for $T_U$ and $T_D$ are determined either empirically and/or theoretically, these values are loaded into the matrix A. Each row of the matrix A will contain values from each term of the corresponding linear filter equation. For instance, in Equation (15), the corresponding matrix A would have a series of rows containing values from each term of Equation (15). For instance, the first row of matrix A would have the first value equal to $T_U$, the second value would be equal to $T_D$, the third value would be equal to $T_U^2$, the fourth value would be equal to $T_U/T_D$, the fifth value would be equal to $T_U^3$, the sixth value would be equal to $T_D{}^3$, and the seventh value of the first row would be equal to 1. The values used for $T_U$ and $T_D$ for the first row would correspond to the value used for flow rate in the first position of the vector B. The values used for $T_U$ and $T_D$ in the second row of the matrix A would correspond to the value used for the flow rate in the second position of the vector B. Similarly, the values for $T_U$ and $T_D$ in the subsequent rows of the matrix A would correspond to the value for flow rate in the corresponding subsequent positions of the vector B. Once the matrix A is fully determined using values for $T_U$ and $T_D$ derived empirically and/or theoretically, the procedure then goes to step 1016 where a singular value decomposition of the matrix $A^{-1}$, is performed. Using standard notation of the art, $A^{-1}=V*[\mathrm{diag}(1/\omega_j)]*U^T$. After the singular value decomposition is computed in step 1016, the procedure goes to step 1018, where all values of $\omega_j$ are checked and any $\omega_j$ that is less than a certain threshold $\omega_{TH}$ (e.g., 0.01) is set equal to zero. The procedure then goes to step 1020, where back substitution is performed to obtain the filter coefficient vector x. In notation known in the art, this vector x is equal to $V*[\mathrm{diag}(1/\omega_j)]*(U^T*b)$. Once the linear filter coefficients are determined in step 1020, the procedure goes to step 1022 where it ends.

Figure 11A:
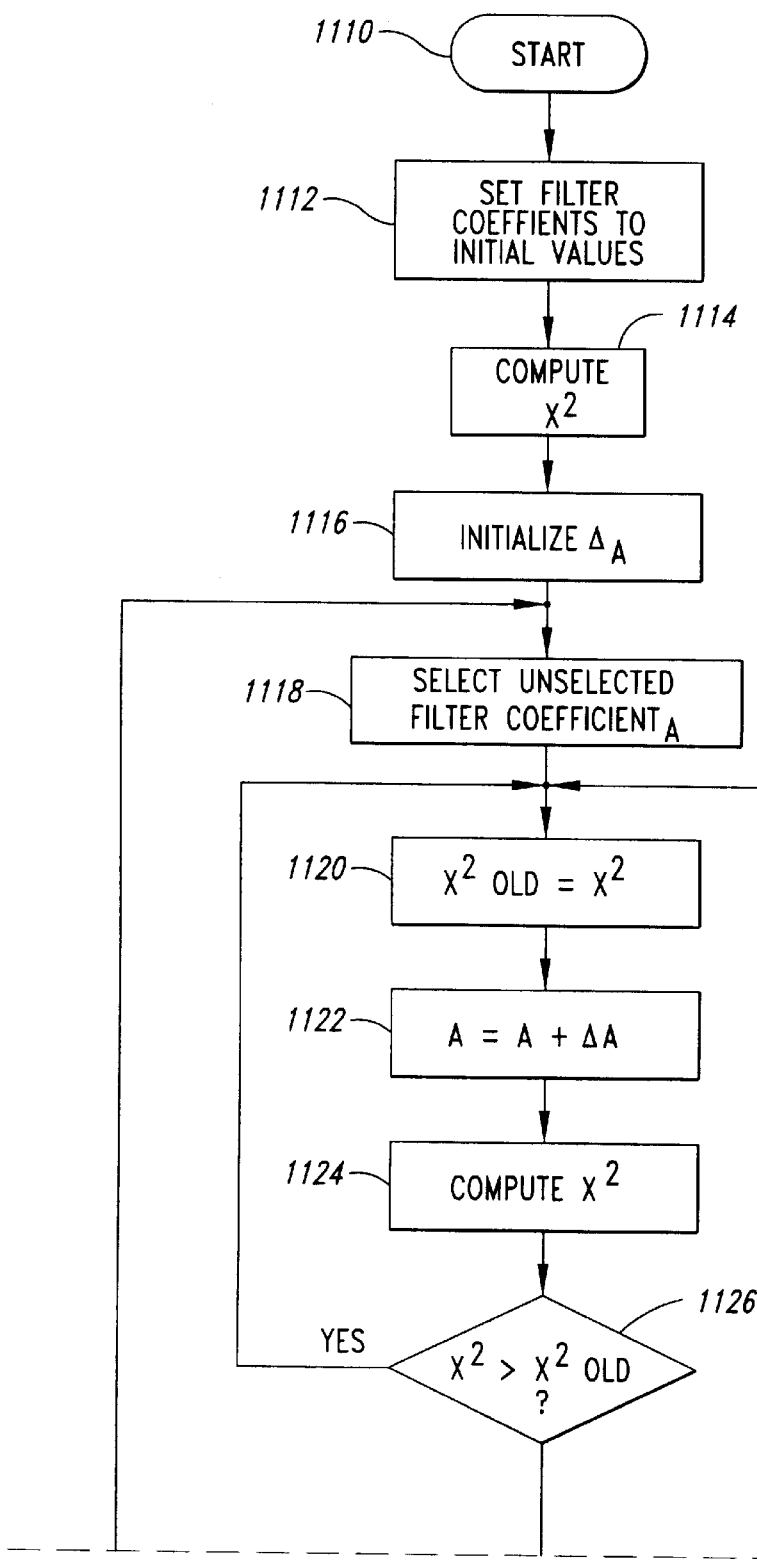
FIGS. 11A and 11B show a flowchart illustrating an alternative procedure to determine coefficients of non-linear equations used by the flowmeter of FIG. 1.
Figure 11B:
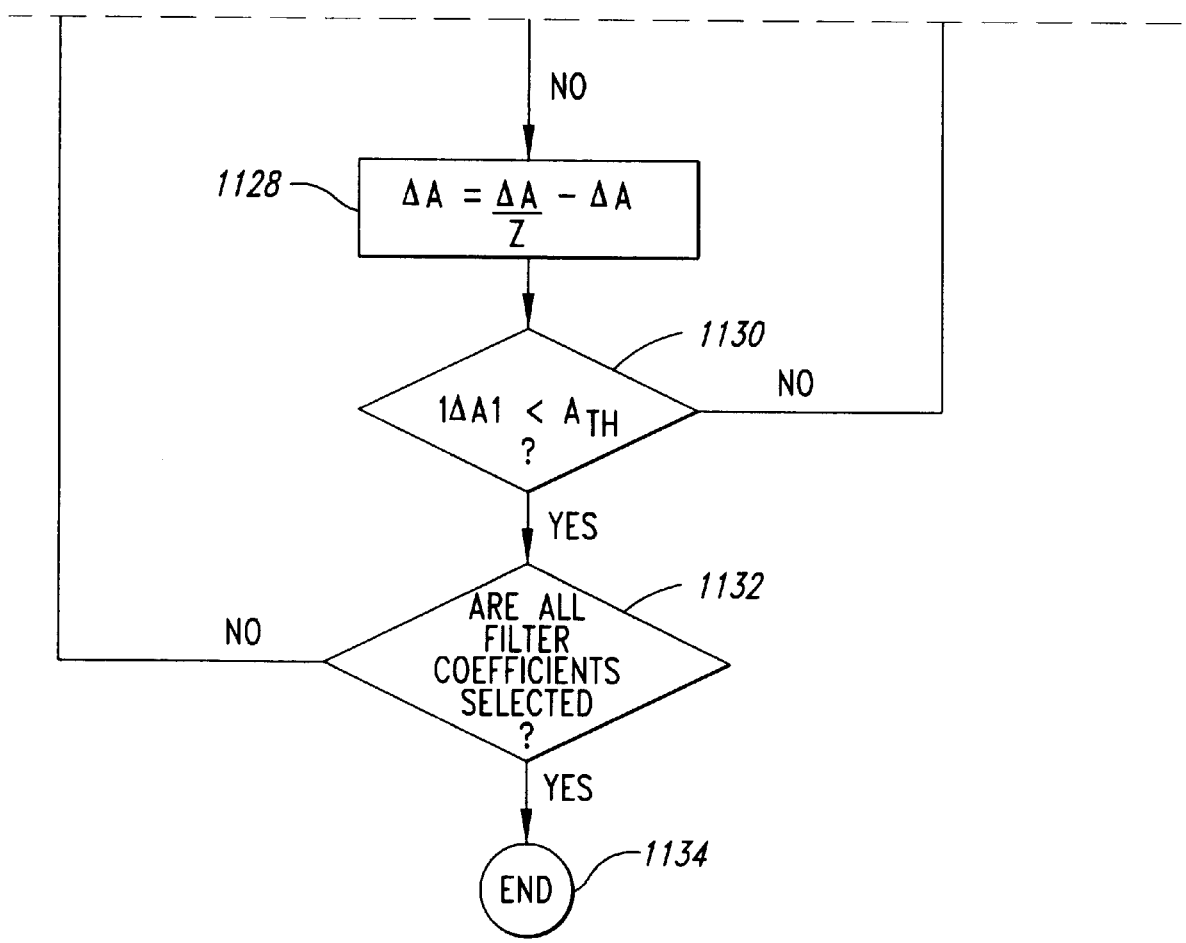

The flowmeter 110 determines coefficients for non-linear filters using a grid search technique. Other embodiments use other techniques known in the art some of which are referenced above. These non-linear filters have equations in which some of the parameters cannot be separated into different terms of a sum as in the linear equations described above. Equation (11) is a representative example of a non-linear equation where the filter coefficients of Equation (11), a1–a4, are determined by this procedure. The procedure for determining non-linear equations is illustrated in FIGS. 11A and 11B, where it starts at step 1110 and goes to step 1112 where the filter coefficients are set to an initial value. This initial value could, for instance, be 1. In the example of Equation (11), the non-linear filter coefficients a1–a4 would be set to 1. After the non-linear coefficients are set to an initial value, the procedure goes to step 1114, where $X^2$ is computed in step 1114. $X^2$ is given by Equation (17).

$$X^2 = \sum_j \frac{y_j - y(x_j)^2}{U_j^2} \tag{17}$$

Here $U_j$ are the uncertainties in flow estimates, $y_j$ is the measured flow rates and $y(x_j)$ is the predicted flow rates from the non-linear equation.

After $X^2$ is computed in step 1114, the grid search procedure goes to step 1116, where $\Delta a$ is initialized. In this representative example for this step, $\Delta a$ is set to the value 3. The procedure then goes to step 1118 where one of the non-linear filter coefficients, a1–a4, is selected. Typically the first filter coefficient selected is a1. In any case, in step 1118, whenever a filter coefficient is selected, the selection is made from those filter coefficients that have not been selected previously.

Once an unselected filter coefficient has been selected in step 1118, the procedure goes to step 1120 where $X_{OLD}^2$ is set equal to $X^2$. The procedure then goes to step 1122, where the value for the selected coefficient is incremented by $\Delta a$. After this, the procedure computes $X^2$ in step 1124, and goes to decision step 1126 where it is determined whether the new value for $X^2$ is greater than the value for $X_{OLD}^2$ and if so, branches under the "yes" condition back to step 1120, but if it is not, branches under the "no" condition to step 1128. In step 1128, $\Delta a$ is adjusted after which the procedure goes to step 1130. In step 1130, if the absolute value of $\Delta a$ is less than a threshold $a_{TH}$, the decision step branches under the "yes" condition to decision step 1132 and if not, branches under the "no" condition back to step 1120. The threshold $a_{TH}$ is typically a small value such as 0.0001 for the depicted embodiment. In decision step 1132, a check is made whether all filter coefficients have been selected. If not, the decision step 1132 branches under the "no" condition back to step 1118 and if so, branches under the "yes" condition to step 1134 where the procedure ends.

Figure 12:
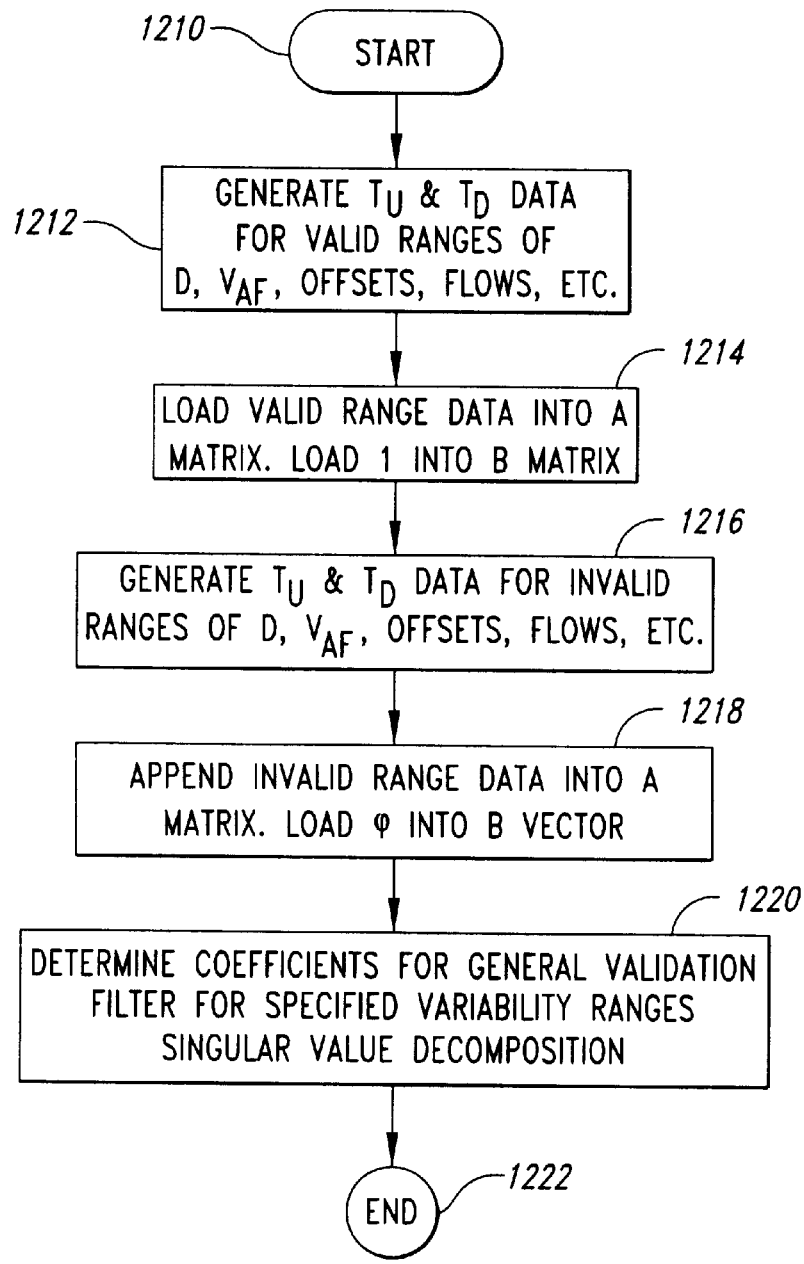
FIG. 12 is a flowchart illustrating a procedure to determine coefficients for a general validation filter used by the processor of FIGS. 2 and 3.

In step 914 of FIG. 9, a general validation filter was first checked to see if conditions in which $T_U$ and $T_D$ were measured had parameter variabilities that were all in presumed ranges. The validity filter output was generated by the validation filter Equation (11). This validation filter equation also has coefficients to be determined. A procedure to determine these coefficients starts at step 1210 of FIG. 12 and goes to step 1212. Here in step 1212, $T_U$ and $T_D$ data are generated for valid ranges of diameter, D, acoustic fluid velocity, $V_{AF}$, and both differential and common offset errors in timing due to such things as imperfections with the electronics. As in an exemplary embodiment, valid ranges for these parameters are as follows. The diameter, D, ranges from 0.4 to 0.6 inches in steps of 0.02 inches. The acoustic fluid velocity, $V_{AF}$ ranges from 0.03 inches per $\mu$sec to 0.09 inches per $\mu$sec in steps of 0.01 inches per $\mu$sec. The differential offsets range from $-10$ $\mu$sec to $+10$ $\mu$sec in steps of 1 lsec. The common offsets range from $-25$ $\mu$sec to $+25$ $\mu$sec in steps of 1 $\mu$sec. The flow rates range from 0 to 25 gal/min in steps of 0.5 gal/min. Various combinations of these parameter values are used with Equations (2)–(4) to generate corresponding values for $T_U$ and $T_D$.

After the numerical calculations in step 1212 are completed, the procedure goes to step 1214 where the data of $T_U$ and $T_D$ are used to generate the terms of the A matrix according to the individual terms based on $T_U$ and/or $T_D$ of the validity filter Equation (11). Also, in step 1214, 1's are loaded into corresponding positions in the B matrix. The procedure then goes to step 1216, where $T_U$ and $T_D$ data are generated for invalid ranges of pipe diameter, D, acoustic fluid velocity, $V_{AF}$, differential and common offset errors, and flow rates. In an exemplary embodiment, typical invalid ranges for these parameters include the following. The diameter, D, ranges from 0 to 0.39 inches and also from 0.61 to 4 inches in steps of 0.02 inches. The flow rates range from 25.25 gal/min to 40 gal/min in steps of 0.5 gal/min. The acoustic fluid velocity, $V_{AF}$, ranges from 0 to 0.29 inches per $\mu$sec in steps of 0.01 inches per $\mu$sec. The common offset errors range from 25.5 $\mu$sec to 50 $\mu$sec in steps of 1 $\mu$sec. The differential offset errors range from 10.5 $\mu$sec to 20 $\mu$sec in steps of 1 $\mu$sec. After the values related to invalid ranges for the parameters are computed in step 1218, the procedure goes to step 1220 where singular value decomposition is used to determine coefficients for the general validation filter Equation (11). After the coefficients are determined, the procedure goes to step 1222 where the procedure ends.

Figure 13:
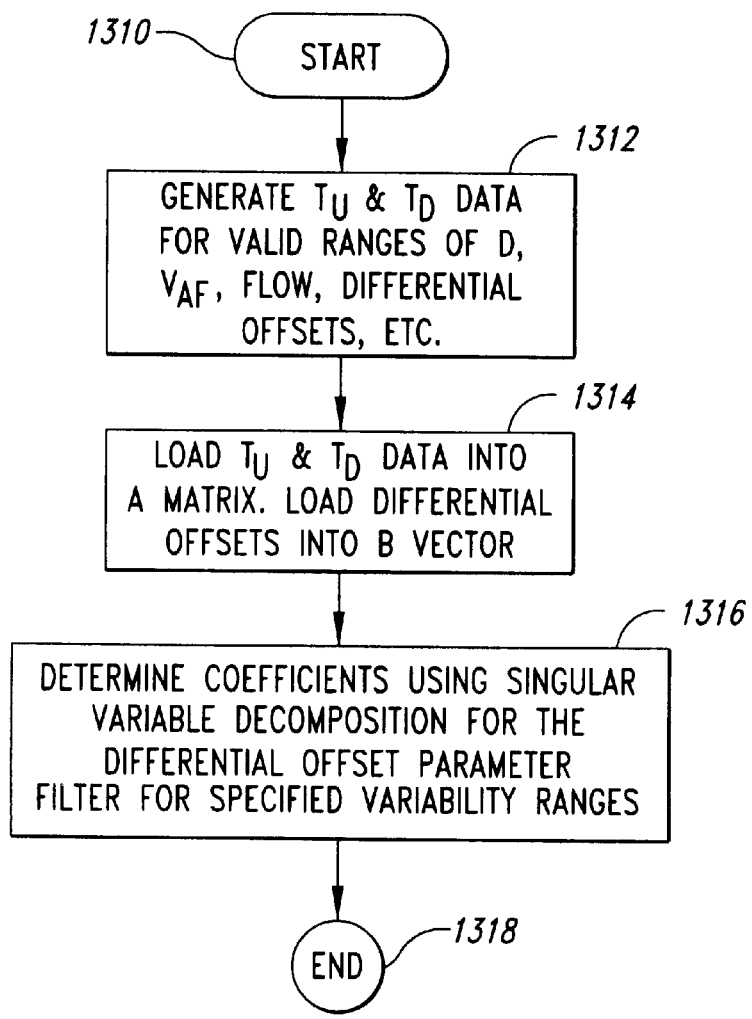
FIG. 13 is a flowchart for a procedure to determine coefficients for a differential offset parameter filter equation used by the processor of FIGS. 2 and 3.

Next, coefficients for the differential offset parameter filter Equation (12) are determined by the procedure starting in step 1310 of FIG. 13 and going to step 1312. In step 1312, $T_U$ and $T_D$ data are generated for valid ranges of pipe diameter, D, acoustic fluid velocity, $V_{AF}$, flow rates, and differential offset errors. In an exemplary embodiment, typical ranges for these parameters include the following. The pipe diameter, D, ranges from 0.4 inches to 0.6 inches in steps of 0.02 inches. The acoustic fluid velocity, $V_{AF}$, ranges from 0.03 inches per $\mu$sec to 0.09 inches per $\mu$sec in steps of 0.01 inches per $\mu$sec. The flow rate ranges from 0 to 20 gal/min in steps of 0.5 gal/min. The differential offset errors range from −10 μsec to 10 μsec in steps of 1 μsec. After $T_U$ and $T_D$ data have been computed based upon these parameters, the procedure then goes to step 1314 where $T_U$ and $T_D$ data is used to generate values to load into the A matrix. These values are generated based upon the $T_U$ and $T_D$ terms found in the differential offset parameter filter Equation (12). Also, the same differential offsets are loaded into the B vector in the order corresponding to the order in the A matrix of the associated $T_U$ and $T_D$ values.

The procedure then goes to step 1316 where the A matrix and B vector is used to determine the coefficients for the differential offset parameter Equation (12) using singular variable decomposition. After the coefficients are determined, the procedure goes on to step 1318 where the procedure ends.

Figure 14:
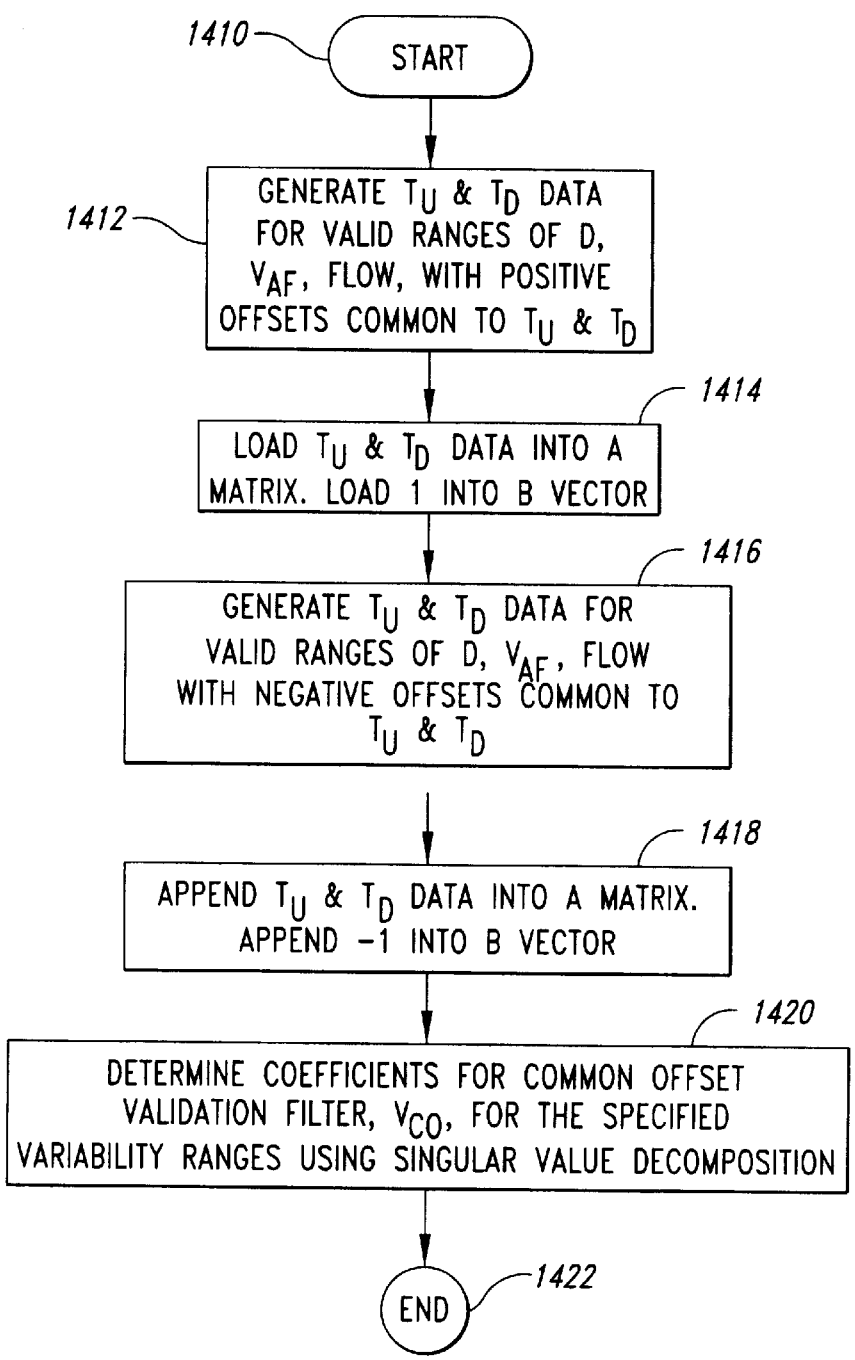
FIG. 14 is a flowchart illustrating a procedure used to determine coefficients for a common offset validation filter used by the processor of FIGS. 2 and 3.

Coefficients for the common offset validation filter Equation (13) are determined by the procedure illustrated in FIG. 14 starting with step 1410, and going to step 1412. In step 1412, $T_U$ and $T_D$ data is generated for valid ranges of pipe diameter, D, acoustic fluid velocity, $V_{AF}$, and flow rates, all with positive error offsets common to both $T_U$ and $T_D$. The valid ranges used for pipe diameter, D, acoustic fluid velocity $V_{AF}$, and flow rate are similar to that already described above for the exemplary embodiment. However, in this case, only positive common offset errors are used and range from 1 to 25 μsec in steps of 1 μsec. After the $T_U$ and $T_D$ has been generated in step 1412, the procedure goes to step 1414, where the $T_U$ and $T_D$ data is used to generate values to load into the A matrix. These values are generated based upon the $T_U$ and/or $T_D$ terms of the common offset validation filter Equation (13). Also, 1's are loaded into the corresponding positions in the B vector.

Next, the procedure goes to step 1416, where $T_U$ and $T_D$ is generated for valid ranges of pipe diameter, D, acoustic fluid velocity, $V_{AF}$, and flow, all with negative offsets common to both $T_U$ and $T_D$. Here, again, the valid ranges for pipe diameter, D, acoustic fluid velocity, $V_{AF}$, and flow, are similar to those described above for the exemplary embodiment. However, only negative offsets common to both $T_U$ and $T_D$ are used, with ranges from −25 μsec to 1 μsec in steps of 1 μsec. Once the $T_U$ and $T_D$ data has been generated in step 1416, the procedure goes to step 1418, where the $T_U$ and $T_D$ data is used to generate values to append to the A matrix using the terms of the common offset validation filter Equation (13). Also, −1 is appended to the corresponding positions of the B vector. The procedure then goes to step 1420, where the coefficients for the common offset validation filter Equation (13) is determined for the specified variability ranges using singular value decomposition. The procedure then goes to step 1422 where it ends.

Figure 15:
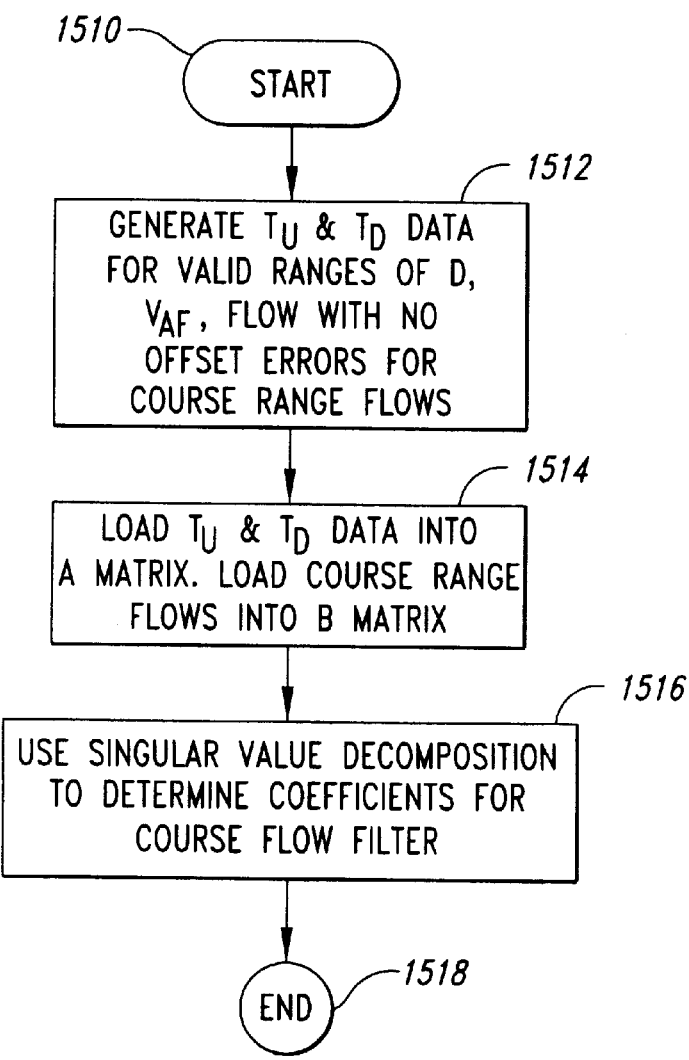
FIG. 15 is a procedure to determine coefficients for a coarse flow filter used by the processor of FIGS. 2 and 3.

The coefficients for the coarse flow rate filter Equation (14) are determined by the procedure illustrated in FIG. 15, starting in step 1510, and going to step 1512. In step 1512, $T_U$ and $T_D$ data is generated for valid ranges of pipe diameter, D, acoustic fluid velocity, $V_{AF}$, and flow, all with no offset errors for these coarse range flow rates. The ranges used for values of pipe diameter, D, acoustic fluid velocity, $V_{AF}$, and flow rate, are similar to those for the exemplary embodiment described above. After $T_U$ and $T_D$ data are computed for these valid ranges of parameters, the procedure goes to step 1514, where the $T_U$ and $T_D$ data is used to generate values to load into the A matrix using the terms found in the coarse flow rate filter Equation (14). Also, the coarse range flow rates are loaded into the corresponding positions in the B matrix. The procedure then goes to step 1516 where the coefficients of the coarse flow rate filter Equation (14) are determined using singular value decomposition. The procedure then goes to step 1518, where it ends.

Figure 16:
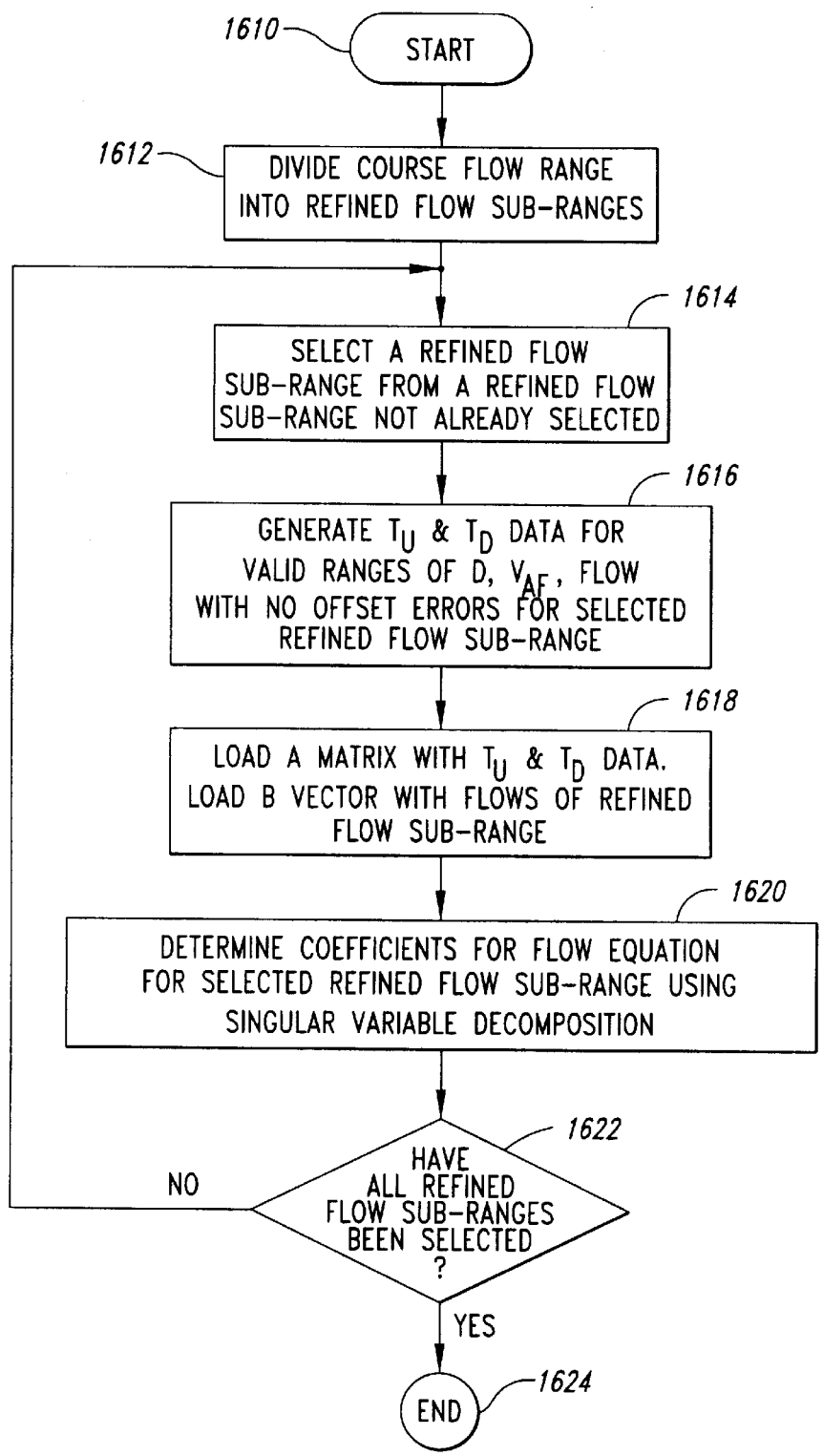
FIG. 16 is a flowchart illustrating a procedure used to determine coefficients for refined flow subrange equations used by the processor of FIGS. 2 and 3.

The coefficients for the refined flow rate filter Equations (15A)–(15E) are determined by the procedure illustrated in FIG. 16, starting with step 1610 and going to step 1612. In step 1612, the range for coarse flow rate is divided into subranges corresponding to the refined flow rate equations. For the exemplary embodiment, the coarse flow rate range is from 0 to 25 gal/min, and is divided into equally spaced 5 gallon ranges for the refined flow rate equations. Next, the procedure goes to step 1614, where a refined flow rate subrange from those subranges not already selected. For instance, if no subranges have been selected, the procedure typically would first select the range 0 to 5 gal/min for the exemplary embodiment. If however, the range 0 to 5 gal/min has already been selected, then the procedure would select the next available range, typically the 5 to 10 gal/min range for the depicted embodiment. After a refined flow rate subrange has been selected, the procedure goes to step 1616, where $T_U$ and $T_D$ data is generated for valid ranges of pipe diameter, D, acoustic fluid velocity, $V_{AF}$, and flow, with no offset errors for the selected refined flow rate subrange. The ranges for pipe diameter D, and acoustic fluid velocity $V_{AF}$ are similar to those for the exemplary embodiment described above. The procedure then goes to step 1618 where the computed $T_U$ and $T_D$ data is used to determine values to load into the A matrix using the refined flow equation corresponding to the selected refined flow rate subrange. The procedure then goes to step 1620, where the coefficients for the refined flow rate equation are determined for the selected refined flow rate subrange using singular variable decomposition. The procedure then goes to decision step 1622, where if all refined flow rate subranges have been selected, the decision step branches under the "yes" condition to step 1624 where the procedure ends, but if not, branches under the "no" condition back to step 1614.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An ultrasonic system for a fluid contained within a pipe, the ultrasonic system comprising:
   an upstream transducer mountable on the pipe, the upstream transducer configured to receive first ultrasonic pulses and to transmit second ultrasonic pulses;
   a downstream transducer mountable on the pipe at a location displaced from the upstream transducer at least along the longitudinal axis of the pipe, the downstream transducer configured to receive the second ultrasonic pulses and to transmit the first ultrasonic pulses; and
   a processor having a timer and a counter, the processor configured to use the timer and counter to determine a time period, $T_U$, associated with the first ultrasonic pulses, the processor configured to use the timer and counter to determine a time period, $T_D$, associated with the second ultrasonic pulses, the processor configured to determine at least one characteristic of the fluid or the pipe based on a filter system configured in accordance with one or more equations having one or more irreducible terms involving $T_U$ and one or more irreducible terms involving $T_D$, the one or more equations having one or more $T_U$ filter coefficients associated with the one or more irreducible terms involving $T_U$ and the one or more equations having one or more $T_D$ filter coefficients associated with the one or more irreducible terms involving $T_D$, at least one of the one or more $T_U$ filter coefficients being unequal in absolute value to at least one of the one or more $T_D$ filter coefficients.

2. The ultrasonic system of claim 1 wherein the filter system configured in accordance with the one or more equations having the one or more irreducible terms involving $T_U$ and the one or more irreducible terms involving $T_D$ includes at least one of the following: one or more linear systems, one or more non-linear systems, and one or more neural network systems.

3. The ultrasonic system of claim 1 wherein the at least one characteristic of the fluid or the pipe is at least one of the following: velocity of the fluid and flow rate of the fluid.

4. The ultrasonic system of claim 1 wherein the one or more $T_U$ filter coefficients and the one or more $T_D$ filter coefficients are selected to account for variability in at least one of the following: interior diameter of the pipe with respect to a specification, alignment of the upstream and downstream transducers with respect to a specification, wall thickness of the pipe with respect to a specification, impingement angle of the first ultrasonic pulses with respect to impingement angle of the second ultrasonic pulses, path length of the first ultrasonic pulses with respect to path length of the second ultrasonic pulses, deposit build up inside the pipe, acoustic velocity of the fluid, and timing delays.

5. An ultrasonic system for a fluid contained within a pipe, the ultrasonic system comprising:
    an upstream transducer mountable on the pipe, the upstream transducer configured to receive first ultrasonic pulses and transmit second ultrasonic pulses;
    a downstream transducer mountable on the pipe at a location displaced from the upstream transducer at least along the longitudinal axis of the pipe, the downstream transducer configured to receive the second ultrasonic pulses and transmit the first ultrasonic pulses; and
    a processor having a timer and a counter, the processor configured to use the timer and counter to determine a time period, $T_U$, associated with the first ultrasonic pulses, the processor configured to use the timer and counter to determine a time period, $T_D$, associated with the second ultrasonic pulses, the processor configured to determine at least one characteristic of the fluid or the pipe based on a filter system configured in accordance with one or more equations having two or more irreducible terms involving $T_U$ and two or more irreducible terms involving $T_D$, the one or more equations having two or more $T_U$ filter coefficients associated with the two or more irreducible terms involving $T_U$ and the one or more equations having two or more $T_D$ filter coefficients associated with the two or more irreducible terms involving $T_D$.

6. The ultrasonic system of claim 5 wherein the filter system configured in accordance with one or more equations having two or more irreducible terms involving $T_U$ and two or more irreducible terms involving $T_D$ includes at least one of the following: one or more linear systems, one or more non-linear systems, and one or more neural network systems.

7. The ultrasonic system of claim 5 wherein the at least one characteristic of the fluid or the pipe is at least one of the following: velocity of the fluid and flow rate of the fluid.

8. The ultrasonic system of claim 5 wherein the one or more $T_U$ filter coefficients and the one or more $T_D$ filter coefficients are selected to account for variability in at least one of the following: interior diameter of the pipe with respect to a specification, alignment of the upstream and downstream transducers with respect to a specification, wall thickness of the pipe with respect to a specification, impingement angle of the first ultrasonic pulses with respect to impingement angle of the second ultrasonic pulses, path length of the first ultrasonic pulses with respect to path length of the second ultrasonic pulses, deposit build up inside the pipe, acoustic velocity of the fluid, and timing delays.

9. An ultrasonic system for a fluid contained within a pipe, the ultrasonic system comprising:
    a first transducer mountable on the pipe, the first transducer configured to receive first ultrasonic pulses and to transmit second ultrasonic pulses;
    a second transducer mountable on the pipe at a location displaced from the first transducer at least along the longitudinal axis of the pipe, the second transducer configured to receive the second ultrasonic pulses and to transmit the first ultrasonic pulses; and
    a processor having a timer and a counter, the processor configured to use the timer and counter to determine a time period, T1, associated with the first ultrasonic pulses, the processor configured to use the timer and counter to determine a time period, T2, associated with the second ultrasonic pulses, the processor configured to determine at least one characteristic of the fluid or the pipe based on T1 and T2 and based on a filter system configured in accordance with one or more equations having one or more irreducible terms involving T1 and two or more irreducible terms involving T2, the one or more equations having one or more T1 filter coefficients associated with the one or more irreducible terms involving T1 and the one or more equations having two or more T2 filter coefficients associated with the two or more irreducible terms involving T2, at least one of the T1 filter coefficients being unequal in absolute value to at least one of the T2 filter coefficients.

10. The ultrasonic system of claim 9 wherein the filter system configured in accordance with one or more equations having one or more irreducible terms involving T1 and two or more irreducible terms involving T2 includes at least one of the following: one or more linear systems, one or more non-linear systems, and one or more neural network systems.

11. The ultrasonic system of claim 9 wherein the at least one characteristic of the fluid or the pipe is at least one of the following: velocity of the fluid and flow rate of the fluid.

12. The ultrasonic system of claim 9 wherein the one or more T1 filter coefficients and the one or more T2 filter coefficients are selected to account for variability in at least one of the following: interior diameter of the pipe with respect to a specification, alignment of the upstream and downstream transducers with respect to a specification, wall thickness of the pipe with respect to a specification, impingement angle of the first ultrasonic pulses with respect to impingement angle of the second ultrasonic pulses, path length of the first ultrasonic pulses with respect to path length of the second ultrasonic pulses, deposit build up inside the pipe, acoustic velocity of the fluid, and timing delays.

13. A method of measurement associated with a fluid contained within a pipe, the method comprising:
    timing a first group of ultrasonic pulses transmitted through the fluid to obtain a first time measurement;

timing a second group of ultrasonic pulses transmitted through the fluid to obtain a second time measurement;

applying one or more filters configured in accordance with one or more equations having one or more first irreducible terms involving the first time measurement and one or more second irreducible terms involving the second time measurement to the first and second time measurements, at least one of the equations having a first coefficient associated with one of the first irreducible terms being unequal in absolute value to a coefficient associated with one of the second irreducible terms; and determining a characteristic of at least one of the pipe and fluid based on the application of the one or more filters.

14. The method of claim 13 wherein the one or more filters configured in accordance with one or more equations having one or more first irreducible terms and one or more second irreducible terms includes at least one of the following: one or more linear systems, one or more non-linear systems, and one or more neural network systems.

15. The method of claim 13 wherein the characteristic of at least one of the pipe and the fluid is one of the following: velocity of the fluid and flow rate of the fluid.

16. The method of claim 13 wherein the one or more first irreducible terms and the one or more second irreducible terms are selected to account for variability in at least one of the following: interior diameter of the pipe with respect to a specification, alignment of the upstream and downstream transducers with respect to a specification, wall thickness of the pipe with respect to a specification, impingement angle of the first ultrasonic pulses with respect to impingement angle of the second ultrasonic pulses, path length of the first ultrasonic pulses with respect to path length of the second ultrasonic pulses, deposit build up inside the pipe, acoustic velocity of the fluid, and timing delays.

17. A method of measurement associated with a fluid contained within a pipe, the method comprising:

timing a first group of ultrasonic pulses transmitted through the fluid to obtain a first time measurement;

timing a second group of ultrasonic pulses transmitted through the fluid to obtain a second time measurement;

applying one or more filters configured in accordance with one or more equations having two or more first irreducible terms involving the first time measurement and two or more second irreducible terms involving the second time measurement to the first and second time measurements, the two or more first irreducible terms having two or more first coefficients and the two or more second irreducible terms having two or more second coefficients; and determining a characteristic of at least one of the pipe and fluid based on the application of the one or more filters to the first time measurement and the second time measurement.

18. The method of claim 17 wherein the one or more filters configured in accordance with one or more equations having two or more first irreducible terms and two or more second irreducible terms includes at least one of the following: one or more linear systems, one or more non-linear systems, and one or more neural network systems.

19. The method of claim 17 wherein the characteristic of at least one of the pipe and the fluid is one of the following: velocity of the fluid and flow rate of the fluid.

20. The method of claim 17 wherein the two or more first irreducible terms and the two or more second irreducible terms are selected to account for variability in at least one of the following: interior diameter of the pipe with respect to a specification, alignment of the upstream and downstream transducers with respect to a specification, wall thickness of the pipe with respect to a specification, impingement angle of the first ultrasonic pulses with respect to impingement angle of the second ultrasonic pulses, path length of the first ultrasonic pulses with respect to path length of the second ultrasonic pulses, deposit build up inside the pipe, acoustic velocity of the fluid, and timing delays.

21. A method of measurement associated with a fluid contained within a pipe, the method comprising:

timing a first group of ultrasonic pulses transmitted through the fluid to obtain a first time measurement;

timing a second group of ultrasonic pulses transmitted through the fluid to obtain a second time measurement;

applying one or more filters configured in accordance with one or more equations having one or more first irreducible terms involving the first time measurement and two or more second irreducible terms involving the second time measurement to the first and second time measurements; and determining at least one characteristic of the pipe or fluid based on the application of the one or more filters to the first and second time measurements.

22. The method of claim 21 wherein the one or more filters configured in accordance with one or more equations having one or more first irreducible terms and two or more second irreducible terms includes at least one of the following: one or more linear systems, one or more non-linear systems, and one or more neural network systems.

23. The ultrasonic system of claim 21 wherein the at least one characteristic of the pipe or fluid is at least one of the following: velocity of the fluid and flow rate of the fluid.

24. The method of claim 21 wherein the one or more first irreducible terms and the two or more second irreducible terms are selected to account for variability in at least one of the following: interior diameter of the pipe with respect to a specification, alignment of the upstream and downstream transducers with respect to a specification, wall thickness of the pipe with respect to a specification, impingement angle of the first ultrasonic pulses with respect to impingement angle of the second ultrasonic pulses, path length of the first ultrasonic pulses with respect to path length of the second ultrasonic pulses, deposit build up inside the pipe, acoustic velocity of the fluid, and timing delays.

25. The method of claim 13 wherein the first coefficient associated with one of the first irreducible terms being unequal in absolute value to a coefficient associated with one of the second irreducible terms is unequal in absolute value to any coefficient associated with one of the second irreducible terms.

* * * * *